United States Patent
Liu et al.

(10) Patent No.: US 12,301,366 B2
(45) Date of Patent: May 13, 2025

(54) HYBRID AUTOMATIC REPEAT REQUEST (HARQ) FEEDBACK CONTROL FOR MULTICAST COMMUNICATIONS

(71) Applicant: QUALCOMM Incorporated, San Diego, CA (US)

(72) Inventors: Le Liu, San Jose, CA (US); Alberto Rico Alvarino, San Diego, CA (US); Kazuki Takeda, Tokyo (JP); Wanshi Chen, San Diego, CA (US); Tao Luo, San Diego, CA (US); Ayan Sengupta, San Diego, CA (US); Xiaoxia Zhang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 18/346,134

(22) Filed: Jun. 30, 2023

(65) Prior Publication Data
US 2024/0146465 A1 May 2, 2024

Related U.S. Application Data

(63) Continuation of application No. 17/219,696, filed on Mar. 31, 2021, now Pat. No. 11,736,239.
(Continued)

(51) Int. Cl.
*H04L 1/1812* (2023.01)
*H04L 1/00* (2006.01)
(Continued)

(52) U.S. Cl.
CPC .......... *H04L 1/1819* (2013.01); *H04L 1/0061* (2013.01); *H04L 1/1896* (2013.01);
(Continued)

(58) Field of Classification Search
CPC ... H04L 1/1819; H04L 1/0061; H04L 1/1896; H04L 2001/0093; H04W 72/0466; H04W 76/11; H04W 76/27; H04W 76/40
See application file for complete search history.

(56) References Cited

U.S. PATENT DOCUMENTS

| | | |
|---|---|---|
| 11,736,239 B2 | 8/2023 | Liu et al. |
| 2019/0123923 A1* | 4/2019 | Belleschi ............... H04L 1/08 |

(Continued)

FOREIGN PATENT DOCUMENTS

| | | | | |
|---|---|---|---|---|
| WO | WO-2018030793 A1 * | 2/2018 | ............... | H04L 1/08 |
| WO | WO-2021109460 A1 * | 6/2021 | ............... | H04L 1/08 |

OTHER PUBLICATIONS

Xiaomi Communications, On Procedures for 5G V2x communications, 3GPP TSG RAN WG1 #98bis, Chongqing, China, Oct. 14-20, 2019, R1-1911291. (Year: 2019).*

(Continued)

*Primary Examiner* — Shailendra Kumar
(74) *Attorney, Agent, or Firm* — Kevin M. Donnelly; Seyfarth Shaw LLP

(57) ABSTRACT

A method for wireless communication performed by a user equipment (UE) includes receiving, from a base station, a first indication to disable hybrid automatic repeat request (HARQ) feedback for a number of instances of a multicast transport block (TB). The method also includes receiving, from the base station, a second indication identifying a value of the number of instances of the multicast TB. The method further includes receiving, from the base station, one or more instances of the multicast TB. The method still further includes determining, based on the one or more received instances, whether the multicast TB is recoverable. The method further includes selectively transmitting, to the base station, HARQ feedback after all instances of the multicast (Continued)

TB have been transmitted by the base station based on the determination of whether the multicast TB is recoverable.

20 Claims, 12 Drawing Sheets

Related U.S. Application Data

(60) Provisional application No. 63/004,369, filed on Apr. 2, 2020.

(51) Int. Cl.
*H04L 1/1867* (2023.01)
*H04W 72/044* (2023.01)
*H04W 72/23* (2023.01)
*H04W 76/11* (2018.01)
*H04W 76/27* (2018.01)

(52) U.S. Cl.
CPC ....... *H04W 72/0466* (2013.01); *H04W 72/23* (2023.01); *H04W 76/11* (2018.02); *H04W 76/27* (2018.02)

(56) References Cited

U.S. PATENT DOCUMENTS

| | | | |
|---|---|---|---|
| 2021/0219329 A1* | 7/2021 | Zhou | H04L 1/1819 |
| 2022/0173840 A1* | 6/2022 | Wang | H04L 1/1812 |
| 2024/0204920 A1 | 6/2024 | Liu et al. | |

OTHER PUBLICATIONS

Xiaomi Communications: "On Procedures for 5G V2x Communications", 3GPP Draft, 3GPP TSG RAN WG1 #98bis, R1-1911291, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 6, 2019 (Oct. 6, 2019), XP051808911, 6 Pages, p. 2. section 2.1. Option 1 p. 3, par. 2. Option 3 p. 3. par. 1. Option 2.

* cited by examiner

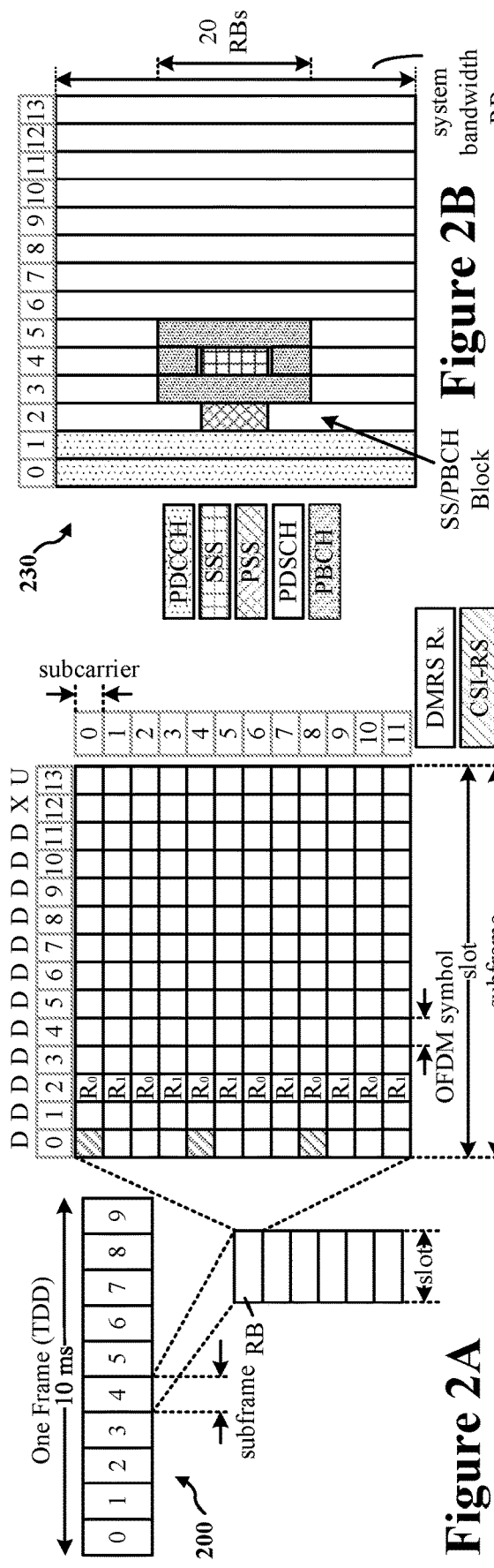
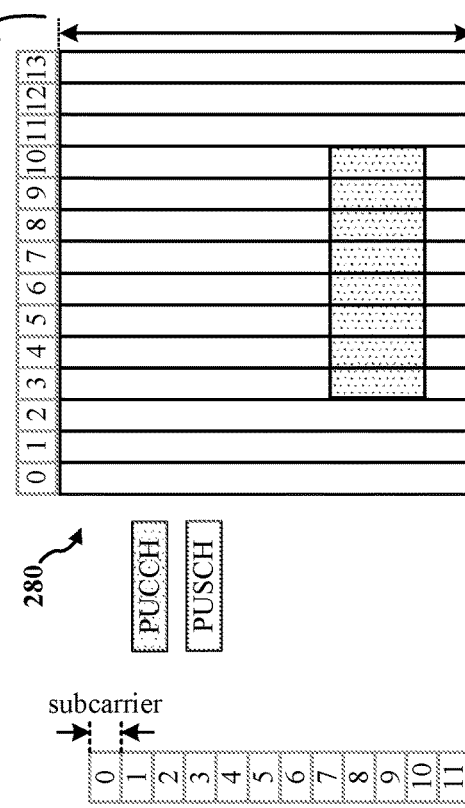
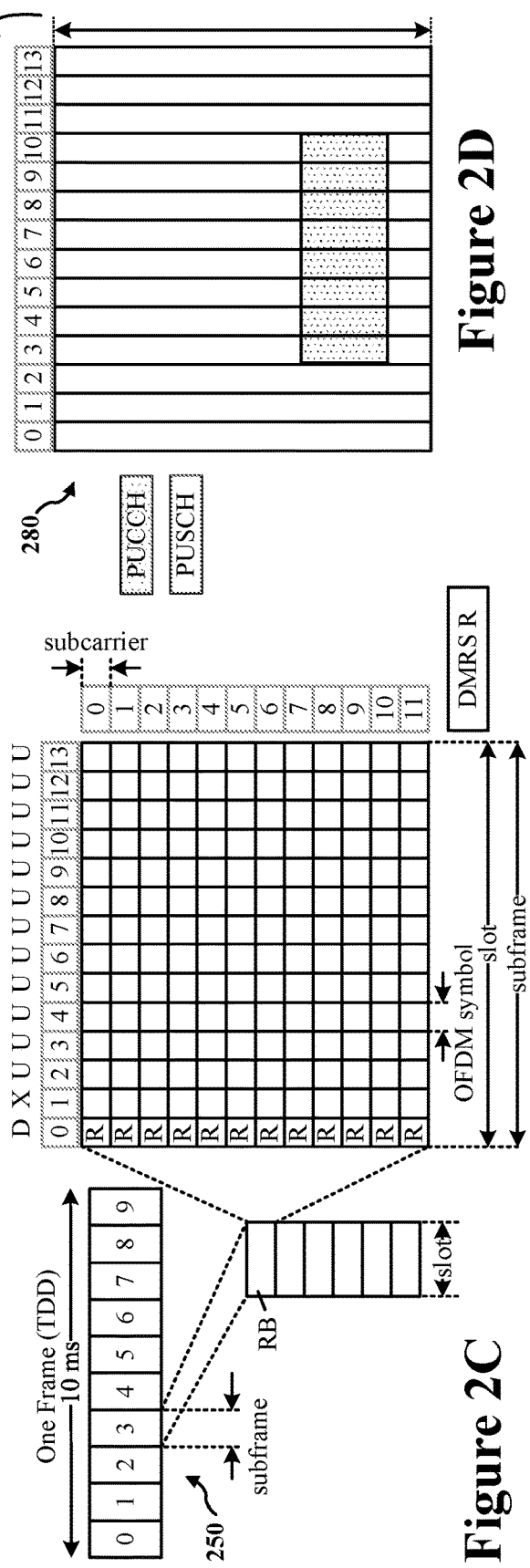

HYBRID AUTOMATIC REPEAT REQUEST (HARQ) FEEDBACK CONTROL FOR MULTICAST COMMUNICATIONS

CROSS-REFERENCE TO RELATED APPLICATION

This application is a continuation application of U.S. application Ser. No. 17/219,696 filed on Mar. 31, 2021, and which claims priority to U.S. Provisional Patent Application No. 63/004,369, filed on Apr. 2, 2020, and titled "HYBRID AUTOMATIC REPEAT REQUEST (HARQ) FEEDBACK CONTROL FOR MULTICAST COMMUNICATIONS," the disclosure of which is expressly incorporated by reference in its entirety.

TECHNICAL FIELD

This disclosure relates generally to wireless communication and, more specifically, to techniques for controlling hybrid automatic repeat request (HARQ) feedback for multicast transmissions.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

Automatic repeat request (ARQ) is a feedback mechanism by which a receiving device may request retransmission of data that was received in error. For example, the receiving device may send a negative acknowledgement (NACK) to the transmitting device if the received data fails a cyclic redundancy check (CRC). Hybrid ARQ (HARQ) adds forward error correction (FEC) and, in some instances, soft combining to the ARQ feedback mechanism. With FEC, the transmitting device adds redundancy (or parity bits) to the transmitted data, which allows the receiving device to correct certain errors in the received data (without requesting retransmission). The receiving device may send a NACK to the transmitting device only if it is still unable to recover the transmitted data after FEC. However, with soft combining, the receiving device may buffer and combine portions of the transmitted data to reduce the number of retransmissions needed to reconstruct or recover a particular unit of data.

HARQ processing may consume significant resources of the receiving device (such as memory, power, and processing resources). In particular, receiving devices located in areas with poor signal quality (such as the edges of a wireless network) may expend a substantial amount of power generating NACKs for unrecoverable data. Thus, it may be desirable to reduce or limit the frequency of NACKs transmitted by the receiving devices.

SUMMARY

In one aspect of the present disclosure, a method for wireless communication by a base station includes determining a number of user equipment (UEs) configured to receive a multicast transport block (TB). The method further includes determining a number of instances of the multicast TB based on the number of UEs. The method still further includes transmitting a first indication to disable hybrid automatic repeat request (HARQ) feedback from the UEs for the instances of the multicast TB. The method also includes transmitting a second indication identifying a value of the number of instances of the multicast TB. The method still further includes transmitting the instances of the multicast TB to the UEs. The method further includes monitoring for HARQ feedback from the UEs after transmitting all instances of the multicast TB. The method still further includes receiving a HARQ feedback message associated with one or more instances of the multicast TB from one or more UEs after transmitting all instances of the multicast TB. The method also includes selectively retransmitting the multicast TB based on receiving the HARQ feedback message from the one or more UEs.

Another aspect of the present disclosure is directed to an apparatus for wireless communication by a base station including means for determining a number of UEs configured to receive a multicast TB. The apparatus further includes means for determining a number of instances of the multicast TB based on the number of UEs. The apparatus still further includes means for transmitting a first indication to disable HARQ feedback from the UEs for the instances of the multicast TB. The apparatus further includes means for transmitting a second indication identifying a value of the number of instances of the multicast TB. The apparatus also includes means for transmitting the instances of the multicast TB to the UEs. The apparatus further includes means for monitoring for HARQ feedback from the UEs after transmitting all instances of the multicast TB. The apparatus still further includes means for receiving a HARQ feedback message associated with one or more instances of the multicast TB from one or more UEs after transmitting all instances of the multicast TB. The apparatus also includes means for selectively retransmitting the multicast TB based on receiving the HARQ feedback message from the one or more UEs.

In another aspect of the present disclosure, a non-transitory computer-readable medium with non-transitory program code recorded thereon for wireless communication by a base station is disclosed. The program code is executed by a processor and includes program code to determine a number of UEs configured to receive a multicast TB. The program code further includes program code to determine a number of instances of the multicast TB based on the number of UEs. The program code still further includes program code to transmit a first indication to disable HARQ feedback from the UEs for the instances of the multicast TB. The program code further includes program code to transmit a second indication identifying a value of the number of instances of the multicast TB. The program code also includes program code to transmit the instances of the multicast TB to the UEs. The program code further includes program code to monitor for HARQ feedback from the UEs after transmitting all instances of the multicast TB. The program code still further includes program code to receive a HARQ feedback message associated with one or more of the instances of the multicast TB from one or more UEs after transmitting all instances of the multicast TB. The program code also includes program code to selectively retransmit the multicast TB based on receiving the HARQ feedback message from the one or more UEs.

Another aspect of the present disclosure is directed to a base station including a processor and a memory communicatively coupled with the processor, the memory storing instructions that, when executed by the processor, cause the base station to determine a number of UEs configured to receive a multicast TB. Execution of the instructions also causes the base station to determine a number of instances of the multicast TB based on the number of UEs. Execution of the instructions further causes the base station to transmit a first indication to disable HARQ feedback from the UEs for the instances of the multicast TB. Execution of the instructions further cause the base station code to transmit a second indication identifying a value of the number of instances of the multicast TB. Execution of the instructions still further causes the base station to transmit the instances of the multicast TB to the UEs. Execution of the instructions also causes the base station to monitor for HARQ feedback from the UEs after transmitting all instances of the multicast TB. Execution of the instructions further causes the base station to receive a HARQ feedback message associated with one or more of the instances of the multicast TB from one or more UEs after transmitting all instances of the multicast TB. Execution of the instructions still further causes the base station to selectively retransmit the multicast TB based on receiving the HARQ feedback message from the one or more UEs.

In one aspect of the present disclosure, a method for wireless communication performed by a UE includes receiving, from a base station, a first indication to disable HARQ feedback for instances of a multicast TB. The method also includes receiving, from the base station, a second indication identifying a value of a number of instances of the multicast TB. The method further includes receiving, from the base station, one or more of the number of instances of the multicast TB. The method still further includes determining, based on the one or more received instances, whether the multicast TB is recoverable. The method also includes selectively transmitting, to the base station after all instances of the multicast TB have been transmitted, HARQ feedback associated with the one or more received instances based on the determination of whether the multicast TB is recoverable.

Another aspect of the present disclosure is directed to an apparatus wireless communication by a UE. The apparatus includes means for receiving, from a base station, a first indication to disable HARQ feedback for instances of a multicast TB. The apparatus also includes means for receiving, from the base station, a second indication identifying a value of a number of instances of the multicast TB. The apparatus further includes means for receiving, from the base station, one or more of the number of instances of the multicast TB. The apparatus still further includes means for determining, based on the one or more received instances, whether the multicast TB is recoverable. The apparatus also includes means for selectively transmitting, to the base station after all instances of the multicast TB have been transmitted, HARQ feedback associated with the one or more received instances based on the determination of whether the multicast TB is recoverable.

In another aspect of the present disclosure, a non-transitory computer-readable medium with non-transitory program code recorded thereon wireless communication by a UE is disclosed. The program code is executed by a processor and includes program code to receive, from a base station, a first indication to disable HARQ feedback for instances of a multicast TB. The program code also includes program code to receive, from the base station, a second indication identifying a value of a number of instances of the multicast TB. The program code further includes program code to receive, from the base station, one or more of the number of instances of the multicast TB. The program code still further includes program code to determine, based on the one or more received instances, whether the multicast TB is recoverable. The program code also includes program code to selectively transmit, to the base station after all instances of the multicast TB have been transmitted, HARQ feedback associated with the one or more received instances based on the determination of whether the multicast TB is recoverable.

Another aspect of the present disclosure is directed to a UE including a modem, a processor communicatively coupled with the modem, and a memory communicatively coupled with the processor and storing instructions that, when executed by the processor in conjunction with the modem, causes the UE to receive, from a base station, a first indication to disable HARQ feedback for instances of a multicast TB. Execution of the instructions further cause the UE to receive, from the base station, a second indication identifying a value of a number of instances of the multicast TB. Execution of the instructions also cause the UE to receive, from the base station, one or more of the number of instances of the multicast TB. Execution of the instructions further cause the UE to determine, based on the one or more received instances, whether the multicast TB is recoverable. Execution of the instructions still further cause the UE to selectively transmit, to the base station after all instances of the multicast TB have been transmitted, HARQ feedback associated with the one or more received instances based on the determination of whether the multicast TB is recoverable.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 2A, 2B, 2C, and 2D show examples of a first 5G/NR frame, downlink (DL) channels within a 5G/NR slot, a second 5G/NR frame, and uplink (UL) channels within a 5G/NR slot, respectively.

DETAILED DESCRIPTION

Figure 1:
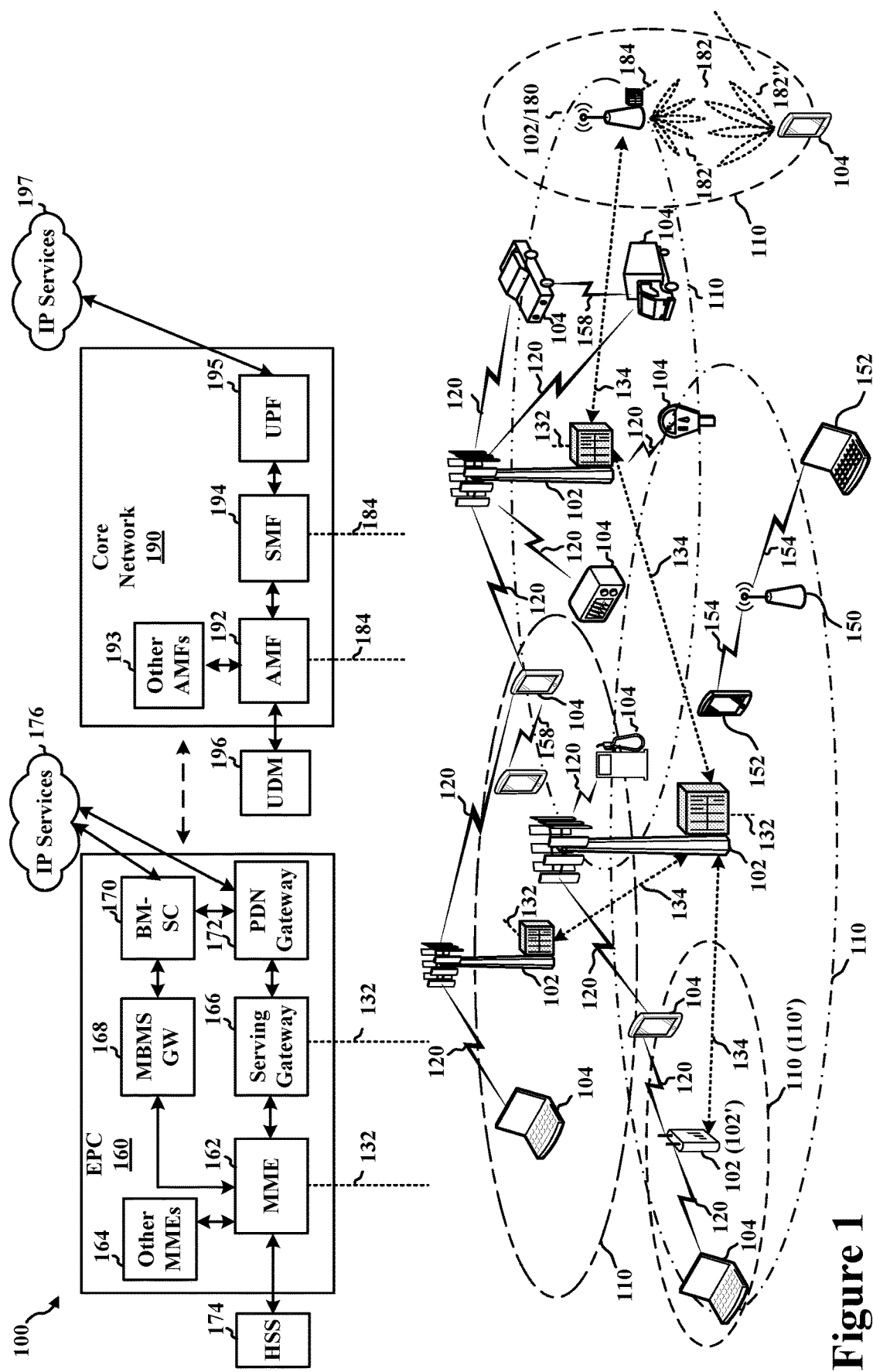
FIG. 1 shows a diagram of an example wireless communications system and an access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an Internet of things (IoT) network.

Various implementations relate generally to reducing or limiting a frequency, or a total number, of hybrid automatic repeat request (HARQ) feedback, such as negative acknowledgments (NACKs), in multicast communications by configuring a transmitting device to transmit a number of instances of a multicast transport block (TB) with each HARQ transmission. The number of instances may be based, at least in part on, a number of receiving devices configured to receive the multicast TB. In some implementations, the transmitting device may suppress HARQ feedback from the receiving devices during the transmission of the number instances of the multicast TB. After transmitting the number instances of the multicast TB, the transmitting device may monitor for HARQ feedback from the receiving devices and selectively retransmit the multicast TB based, at least in part, on whether a HARQ feedback message is received from one or more of the receiving devices.

Particular implementations of the subject matter described in this disclosure can be implemented to realize one or more of the following potential advantages. By transmitting the number of instances of the multicast TB, independent of any HARQ feedback, the transmitting device may reduce the number or frequency of HARQ feedback, such as NACKs, in multicast communications. Aspects of the present disclosure recognize that, in existing HARQ implementations, the number of times a transmitting device may be required to retransmit a multicast TB generally depends on at least the number of recipients of the TB, the distribution of recipients, the target coverage, and reliability, etc. For example, if the recipients of the multicast group are uniformly distributed in the cell, more retransmissions are generally needed to successfully convey a multicast TB to a larger multicast group than to a smaller multicast group, even if targeting the same coverage and reliability. Thus, by scaling the number of instances of the multicast TB to the size of the multicast group, the transmitting device may preempt some, if not all, of the receiving devices from transmitting HARQ feedback. As a result, various implementations reduce power consumption in wireless communication devices. More specifically, some implementations more specifically improve power savings for receiving devices in multicast communications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system and an access network 100. The wireless communications system (also referred to as a wireless wide area network (WWAN)) includes base stations 102, UEs 104, an evolved packet core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be frequency division duplex (FDD) in which, for a particular set of subcarriers (carrier system bandwidth), slots within the set of subcarriers are dedicated for either DL or UL. In other cases, the 5G/NR frame structure may be time division duplex (TDD) in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgment/negative acknowledgment (ACK/NACK) feedback. The PUSCH carries data, and may additionally be used to carry a buffer status report (BSR), a power headroom report (PHR), and/or UCI.

Figure 3:
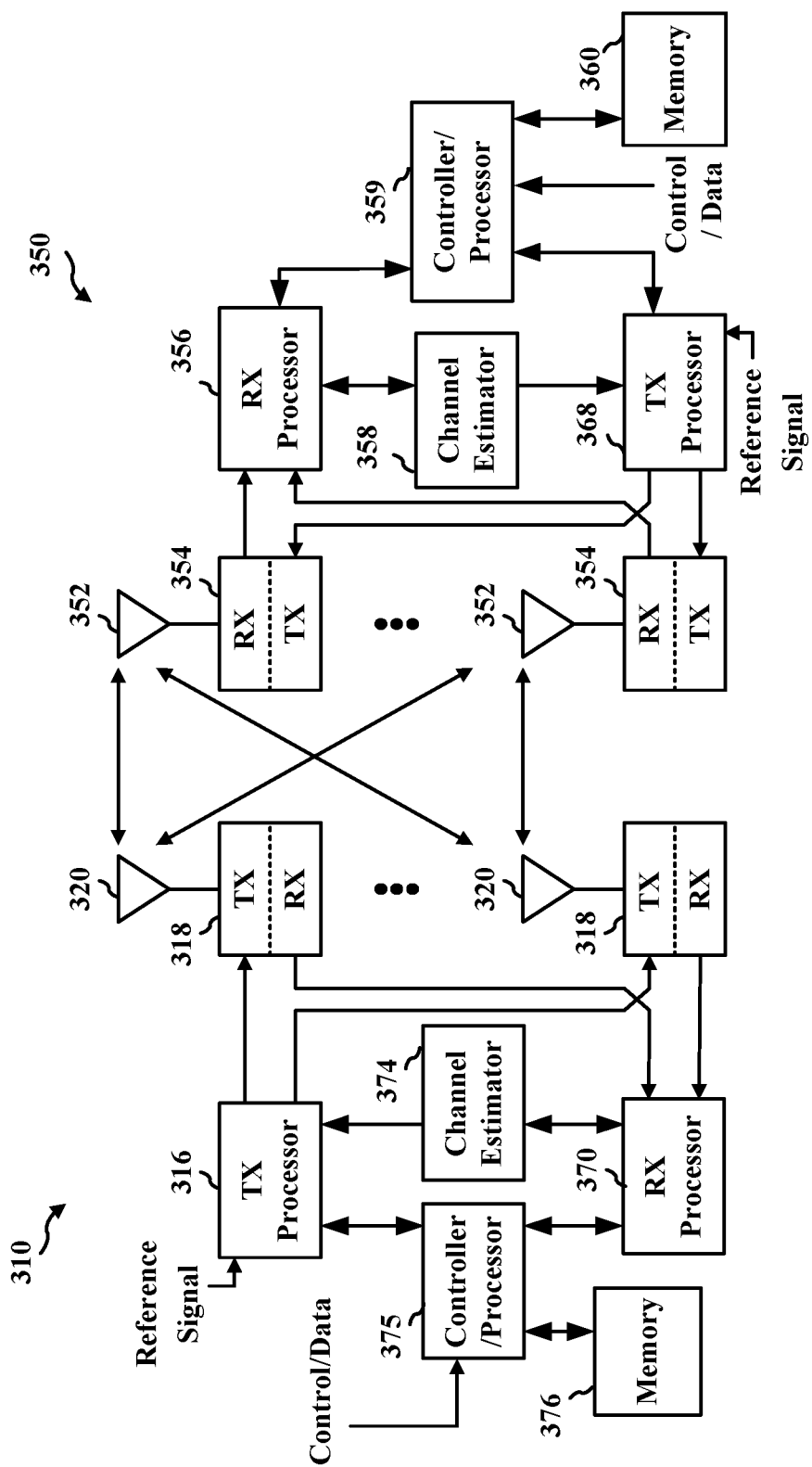
FIG. 3 shows a block diagram of an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TB s, demultiplexing of MAC SDUs from TB s, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Information to be wirelessly communicated (such as for LTE or NR based communications) is encoded and mapped, at the PHY layer, to one or more wireless channels for transmission.

As described above, automatic repeat request (ARQ) is a feedback mechanism by which a receiving device, such as a UE, may request retransmission of data that was received in error. For example, the receiving device may send a NACK to the transmitting device, such as a base station, if the received data fails a cyclic redundancy check (CRC). HARQ adds forward error correction (FEC) and, in some instances, soft combining to the ARQ feedback mechanism. With FEC, the transmitting device adds redundancy (or parity bits) to the transmitted data, which allows the receiving device to correct certain errors in the received data (without requesting retransmission). The receiving device may send a NACK to the transmitting device only if it is still unable to recover the transmitted data after FEC. However, with soft combining, the receiving device may buffer and combine portions of the transmitted data to reduce the number of retransmissions needed to reconstruct or recover a particular unit of data.

HARQ processing may consume significant resources of the receiving device (such as memory, power, and processing resources). In particular, receiving devices in areas of poor signal quality (such as at the edges of a wireless network) may expend a substantial amount of power generating NACKs for unrecoverable data. This problem may be compounded by the number of receiving devices in the network. For example, multicast data transmissions are intended for groups of multiple receiving devices. The more receiving devices in the group, the greater the likelihood of one or more of the receiving devices failing to recover a particular multicast data transmission (or retransmission) and sending a NACK in response to the particular multicast transmission (or retransmission). Thus, it may be desirable to reduce or limit the frequency of NACKs during multicast transmissions.

Various implementations relate generally to reducing power consumption in wireless communication devices. Some implementations more specifically relate to reducing or limiting the frequency of NACKs in multicast communications by configuring a transmitting device to transmit a number (N) of instances of a multicast transport block (TB), with each HARQ transmission, based at least in part on a number of receiving devices configured to receive the TB. In some implementations, the transmitting device may suppress HARQ feedback from at least some of the receiving devices during the transmission of the N instances of the multicast TB. After transmitting the N instances of the multicast TB, the transmitting device may monitor for HARQ feedback from the receiving devices and selectively retransmit the multicast TB based, at least in part, on whether a HARQ feedback message is received from one or more of the receiving devices.

Particular implementations of the subject matter described in this disclosure can be implemented to realize one or more of the following potential advantages. By transmitting N instances of the multicast TB, independent of any HARQ feedback, the transmitting device may reduce the number or frequency of NACKs in multicast communications. Aspects of the present disclosure recognize that, in existing HARQ implementations, the number of times a transmitting device may be required to retransmit a multicast TB generally depends on at least the number of recipients of the TB, the distribution of recipients, the target coverage, and reliability, etc. For example, if the recipients of the multicast group are uniformly distributed in the cell, more retransmissions are generally needed to successfully convey a multicast TB to a larger multicast group than to a smaller multicast group, even if targeting the same coverage and reliability. Thus, by scaling the number of instances of the multicast TB to the size of the multicast group, the transmitting device may preempt some, if not all, of the receiving devices from transmitting NACKs. As a result, the receiving devices may achieve greater power savings in multicast communications.

Figure 4:
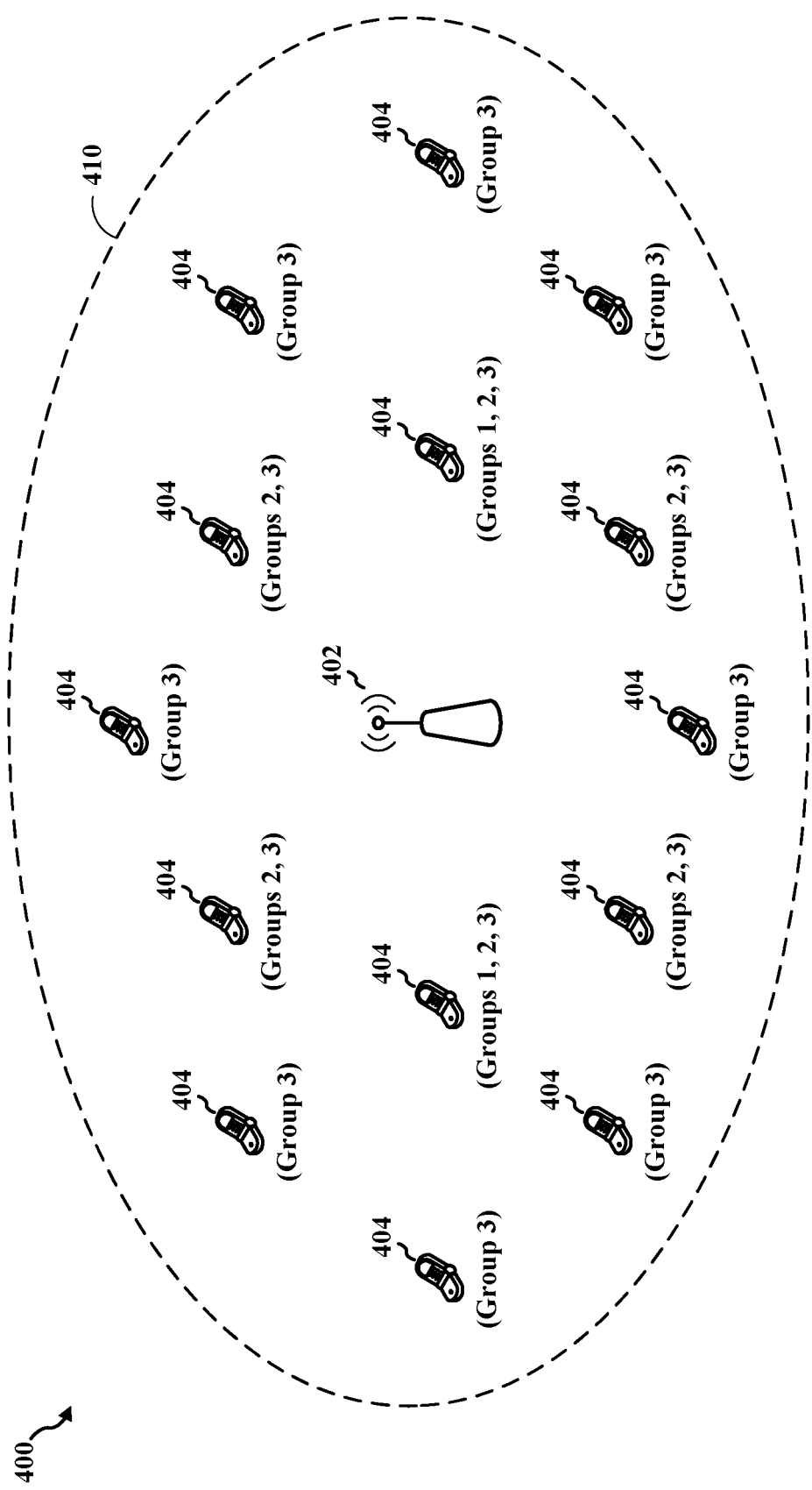
FIG. 4 shows an example wireless communication system configured for multicast communications.

FIG. 4 shows an example wireless communication system 400 configured for multicast communications. The wireless communication system 400 includes a base station 402 and multiple UEs 404 located within a coverage area 410 of the base station 402. In some implementations, the base station 402 may be one example of the base stations 102 or 310 of FIGS. 1 and 3, respectively. In some implementations, each of the UEs 404 may be one example of the UEs 104 or 350 of FIGS. 1 and 3, respectively.

In the example of FIG. 4, the UEs 404 are configured in a number of multicast groups (groups 1-3). UEs 404 belonging to a particular multicast group may receive multicast data, transmitted by the base station 402, for that group. Further, some UEs 404 may belong to multiple multicast groups. For example, UEs 404 belonging to group 1 also belong to groups 2 and 3, and UEs 404 belonging to group 2 also belong to group 3. Thus, group 1 includes two UEs 404, group 2 includes 6 UEs 404, and group 3 includes 14 UEs 404. A UE 404, which fails to receive a recoverable TB, may transit a NACK, to the base station 402, to request retransmission of the multicast TB. As used herein, the term "recoverable TB" refers to any TB that is received error-free or with correctable errors (that can be corrected through FEC or soft combining). Similarly, the term "recoverability" refers to the ability of a UE to correctly decode or otherwise recover the information bits associated with a received TB.

If the base station 402 receives a NACK from at least one of the UEs 404 in a multicast group, the base station 402 may retransmit the multicast TB to the multicast group. The probability that at least one UE in a multicast group will fail to receive a recoverable TB responsive to a given multicast transmission or retransmission varies with respect to the size of the multicast group and the signal quality of the wireless signals at the locations of the UEs. For example, the probability of failure occurring in at least one UE of a large multicast group (such as group 3) is generally higher than the probability of failure occurring in at least one UE of a small multicast group (such as group 1). Further, the probability of failure occurring in a UE at the edge of the network or coverage area 410 (such as the UEs 404 in group 3) is generally higher than the probability of failure occurring in a UE close to the base station 402 (such as the UEs 404 in group 1).

Figure 5:
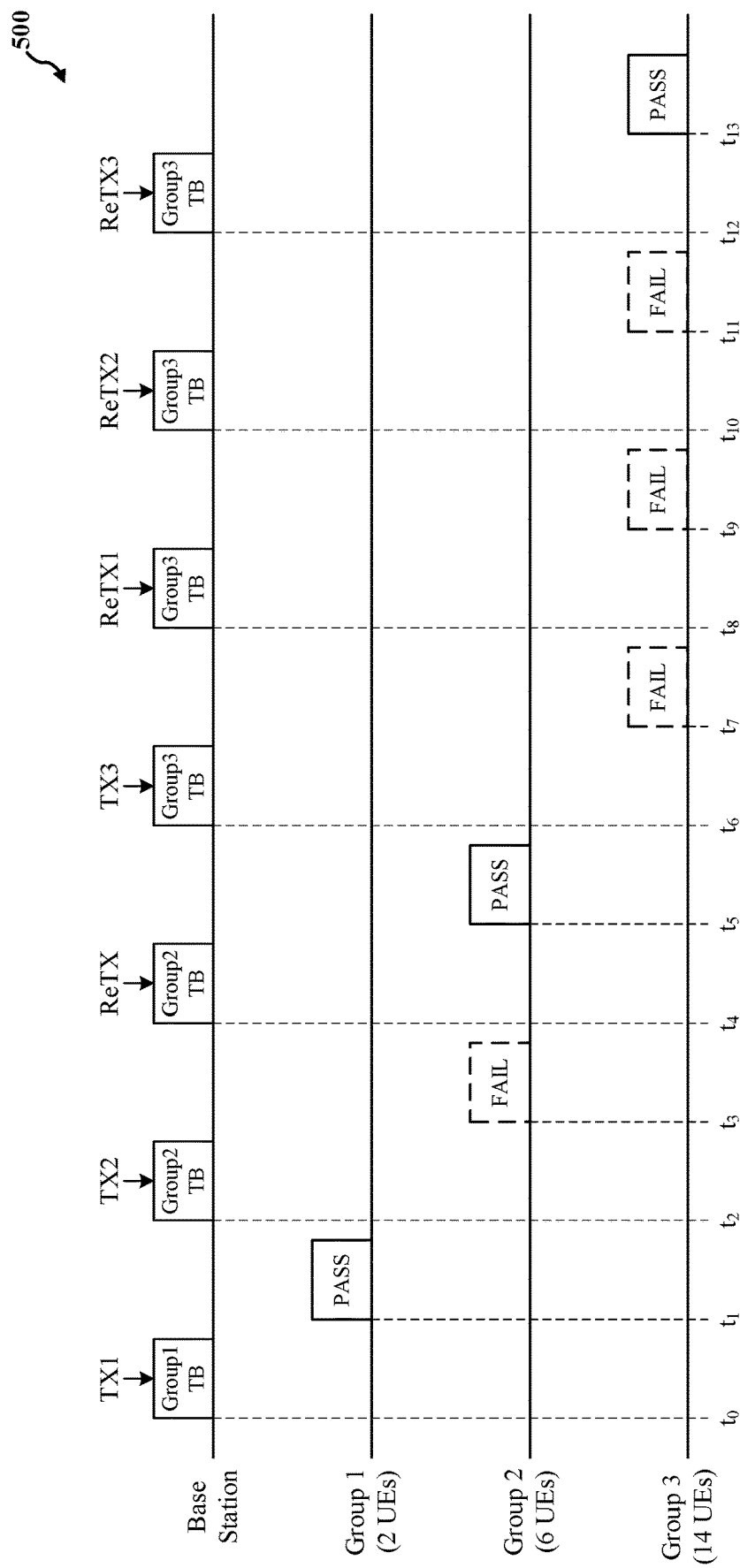
FIG. 5 shows a timing diagram depicting example multicast communications between a base station and multiple groups of UEs.

FIG. 5 shows a timing diagram 500 depicting example multicast communications between a base station and multiple groups of UEs (groups 1-3). The base station of FIG. 5 may correspond to base station 402 of FIG. 4. Similarly, the multicast groups 1-3 of FIG. 5 may correspond to multicast groups 1-3, respectively, of FIG. 4. With reference, for example, to FIG. 4, group 1 includes 2 UEs, group 2 includes 6 UEs, and group 3 includes 14 UEs.

In the example of FIG. 5, the base station transmits respective multicast TBs to each of the groups 1-3 in succession. Instances in which all of the UEs in a multicast group receive a recoverable TB are labeled "pass," while instances in which at least one of the UEs in a multicast group fails to receive a recoverable TB are labeled "fail." As described above, the probability that at least one UE in a multicast group will fail to receive a recoverable TB responsive to a given multicast transmission or retransmission varies with respect to the size of the multicast group and the signal quality of the wireless signals at the locations of the UEs. For example, assuming the block error rate (BLER) associated with any given UE is p<<1, the probability (P) that at least one UE in a multicast group will fail to receive a recoverable TB may be expressed as a function of the number ($N_{UE}$) of UEs in the multicast group:

$$P=1-(1-p)^{N_{UE}} \approx pN_{UE}$$

At time $t_0$, the base station transmits a multicast TB to group 1. Because group 1 includes only 2 UEs that are in relatively close proximity of the base station, the likelihood of at least one UE in group 1 failing to receive a recoverable TB based on the initial multicast transmission (TX1) is very low. In the example of FIG. 5, all of the UEs in group 1 receive recoverable TBs at time $t_1$. Thus, the base station does not need to retransmit the multicast TB to the UEs of group 1.

At time $t_2$, the base station transmits a multicast TB to group 2. Because group 2 includes 6 UEs, the likelihood of at least one UE in group 2 failing to receive a recoverable TB based on the initial multicast transmission (TX2) is higher than that of group 1. In the example of FIG. 5, at least one of the UEs in group 2 fails to receive a recoverable TB at time $t_3$. Thus, at time $t_4$, the base station retransmits the multicast TB to the UEs of group 2. As a result of soft combining and redundancy in the retransmitted TB, the likelihood of at least one UE in group 2 failing to receive a recoverable TB drops significantly based on the retransmission (ReTX). In the example of FIG. 5, all of the UEs in group 2 receive recoverable TBs at time $t_5$.

At time $t_6$, the base station transmits a multicast TB to group 3. Because group 3 includes 14 UEs, many of which are at the edges of the coverage area, the likelihood of at least one UE in group 3 failing to receive a recoverable TB based on the initial multicast transmission (TX3) is very high. In the example of FIG. 5, at least one of the UEs in group 3 fails to receive a recoverable TB at time $t_7$. Thus, at time $t_8$, the base station retransmits the multicast TB to the UEs of group 3. In the example of FIG. 5, at least one of the UEs in group 3 fails to receive a recoverable TB, at time $t_9$, based on the first retransmission (ReTX1). Thus, the base station retransmits the multicast TB to the UEs of group 3 at time $t_{10}$. In the example of FIG. 5, at least one of the UEs in group 3 fails to receive a recoverable TB, at time $t_{11}$, based on the second retransmission (ReTX2). Thus, the base station retransmits the multicast TB to the UEs of group 3 at time $t_{12}$. In the example of FIG. 5, all of the UEs in group 3 receive recoverable TBs, at time $t_{13}$, based on the third retransmission (ReTX3).

As shown in FIG. 5, the number of retransmissions needed to successfully convey a multicast TB to a multicast group depends on the number of UEs in the group. Larger groups generally require a greater number of retransmissions than smaller groups. In existing HARQ implementations, each retransmission is triggered by a NACK transmitted by at least one UE in the multicast group. With reference, for example, to FIG. 5, one or more NACKs may be transmitted during each of the "fail" instances at times $t_3$, $t_7$, $t_9$, and $t_{11}$. As described above, frequent NACK transmissions may increase power consumption of the UEs as well as overhead in multicast communications.

In some implementations, the base station may determine a number (N) of instances of a multicast TB to be transmitted to a multicast group based, at least in part, on the number of receiving devices in the multicast group. Each instance may include some or all of the information in the multicast TB (such as TX1, TX2, or TX3) or a retransmission (such as ReTX, ReTX1, ReTX2, or ReTX3). With reference for example to FIG. 5, the base station transmits 1 instance (TX1) of the multicast TB for group 1, 2 instances (TX2 and ReTX) of the multicast TB for group 2, and 4 instances (TX3, ReTX1, ReTX2, and ReTX3) of the multicast TB for group 3. The data included in each instance of a multicast TB may depend on the HARQ type or soft combining technique implemented by the HARQ process. For example, in some aspects, the base station may transmit the same multicast data with each instance of the multicast TB (such as when implementing Chase combining). In some other aspects, the base station may transmit different multicast data with each successive instance of the multicast TB (such as when implementing incremental redundancy).

In some aspects, the base station may transmit all N instances of the multicast TB before making a subsequent determination as to whether additional retransmissions are required. With reference, for example, to FIG. 5, prior to the initial multicast transmission (TX3) at time $t_6$, the base station may determine to transmit 4 instances of the multicast TB to the UEs in group 3. The base station may then proceed to transmit all 4 instances of the multicast TB, from times $t_6$ to $t_{12}$, before making a subsequent determination as to whether a retransmission of the multicast TB is needed. More specifically, the base station may selectively retransmit the multicast TB (or at least one or more instances of the multicast TB) based on whether a NACK is received, at time $t_{13}$, from at least one of the UEs in group 3. In ACK-only implementations, the base station may selectively retransmit the multicast TB based on whether no ACK is received, at time $t_{13}$, from at least one of the UEs in group 3.

Figure 6A:
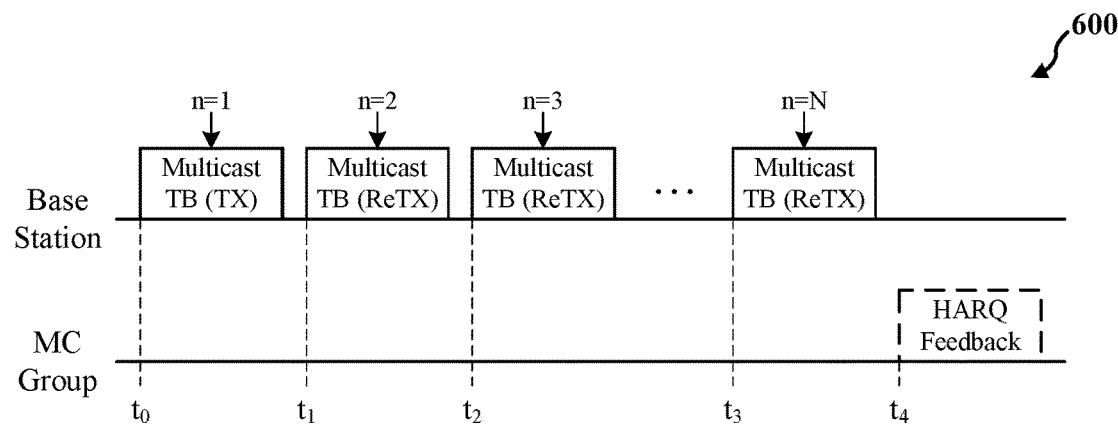
FIGS. 6A-6C show timing diagrams depicting example multicast communications between a base station and a multicast group, according to some implementations.
Figure 6B:
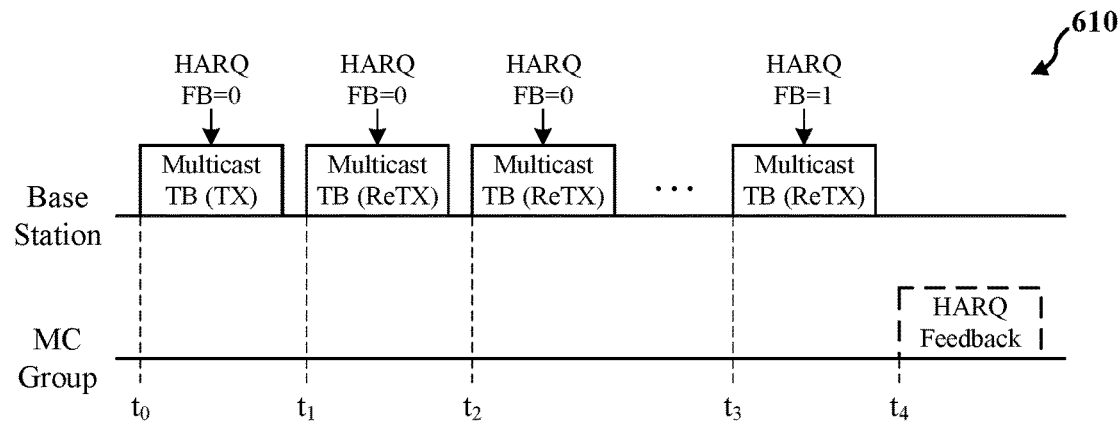
Figure 6C:
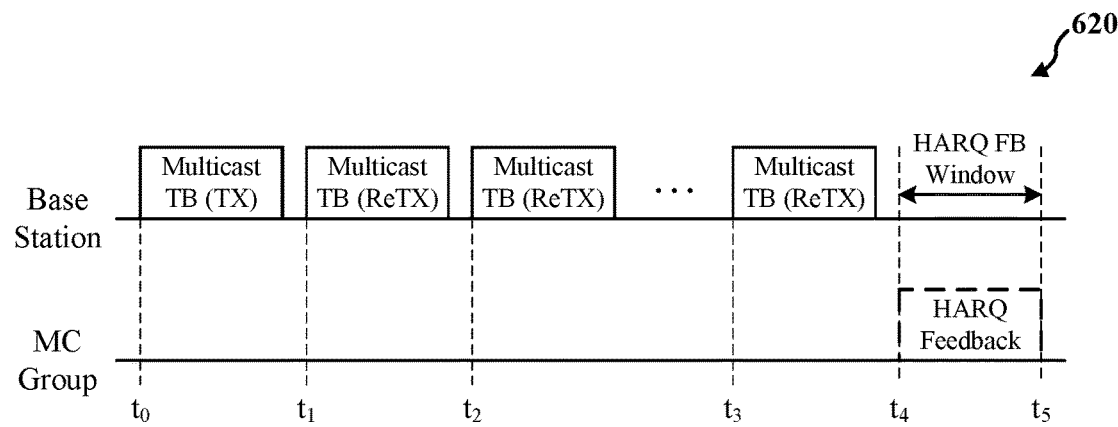

FIGS. 6A-6C show timing diagrams 600-620, respectively, depicting example multicast communications between a base station and a multicast (MC) group, according to some implementations. In some implementations, the base station may be one example of the base stations 102, 310, or 402 of FIGS. 1, 3, and 4, respectively. The multicast group may include a number (Nu E) of UEs. In some implementations, each UE may be one example of the UEs 104, 350, or 404 of FIGS. 1, 3, and 4, respectively. The multicast communications 600-620 are associated with respective HARQ processes by which the base station transmits a multicast TB to the UEs in the multicast group.

In some implementations, the base station may determine a number (N) of instances of the multicast TB to be transmitted to the multicast group based, at least in part, on the number (Nu E) of UEs in the multicast group. In some aspects, the number N of instances to be transmitted to the multicast group also may depend on the number of UEs and the signal quality reported by each UE in the multicast group. For example, the base station may further determine N based on a signal-to-interference-plus-noise ratio (SINR) or channel quality indicator (CQI) reported by each UE in the multicast group. In the examples of FIGS. 6A-6C, the base station may transmit each of the N instances of the multicast TB in a respective HARQ transmission (or retransmission). For example, the base station may transmit the first instance of the multicast TB in an initial HARQ transmission (TX) and may transmit the remaining N−1 instances of the multicast TB in successive retransmissions (ReTX) associated with the same HARQ process.

In some implementations, the base station may suppress HARQ feedback from the UEs in the multicast group during the transmission of the N instances of the multicast TB. In other words, the base station may transmit all N instances of the multicast TB uninterrupted. In the examples of FIG. 6A-6C, the base station may monitor for HARQ feedback from the UEs only after the $N^{th}$ instance of the multicast TB has been transmitted. The base station may be limited to a maximum number ($N_{max}$) of retransmissions for a given HARQ process. Thus, in some aspects, the base station may configure the number (N) of instances of the multicast TB to be less than or equal to the maximum number $N_{max}$ of retransmissions plus the initial transmission (N≤$N_{max}$+1). If the number (N) of instances is equal to $N_{max}$+1, the base station may not allow any HARQ feedback for the associated HARQ process.

In some implementations, the base station may indicate to the UEs to refrain from transmitting HARQ feedback until all N instances of the multicast TB are transmitted. For example, the base station may indicate the number of instances of the multicast TB and a respective index (n) associated with each HARQ transmission or retransmission (1≤n≤N). In some aspects, the indication of the number (N) of instances for a multicast traffic channel (MTCH) may be transmitted to each of the UEs in the multicast group via a multicast control channel (MCCH). In some other aspects, the indication of the number (N) of instances for MCCH or MTCH may be transmitted via a broadcast radio resource control (RRC) message associated with the multicast transmission or via unicast RRC messages to respective UEs in the multicast group. Each of the indices (n) may be indicated via downlink control information (DCI) transmitted with a respective one of the HARQ transmissions or retransmissions. Aspects of the present disclosure recognize that each HARQ transmission and retransmission associated with the same HARQ process may include the same new data indicator (NDI) but different redundancy version (RV) values. Thus, in some aspects, each of the indices (n) may be jointly coded with, or otherwise represented by, the RV and NDI information associated with the respective HARQ transmission. For example, the RV for the initial transmission and each retransmission associated with the same HARQ process ID may follow a predefined order. The RV=0 may be used for the initial transmission and RV=2, 1, and 3 may be used for the $1^{st}$, $2^{nd}$, and $3^{rd}$ retransmission, respectively. The NDI bit in DCI has the same value for each transmission and retransmission associated with the same HARQ process ID. Thus, the UE can derive the indices (n) of a HARQ process ID by the RVs indicated in the DCI.

With reference for example to FIG. 6A, the base station transmits a first instance of the multicast TB via an initial HARQ transmission (TX) at time to and the remaining N−1 instances of the multicast TB via subsequent retransmissions (ReTX) of the multicast TB from times $t_1$-$t_3$. The base station may transmit an indication of the number (N) of instances to each of the UEs via an MCCH or an RRC message associated with the multicast transmission, where the RRC message can be transmitted in a SIB or in unicast PDSCHs to respective UEs of the multicast group, prior to time to (not shown for simplicity). Each UE may determine, based on the received indication, not to transmit HARQ feedback until the base station has completed transmitting all N instances of the multicast TB. The initial HARQ transmission has an index n=1 and the subsequent N−1 retransmissions have respective indices n=2 to n=N. The indices (n) may be indicated in respective DCIs associated with each HARQ transmission and retransmission. Thus, if a particular UE misses or otherwise fails to receive one or more of the HARQ transmission or retransmissions, the UE may continue to monitor for transmissions of the remaining instances of the multicast TB to be transmitted by the base station based on the indices of the received HARQ transmission or retransmissions. A UE that receives a recoverable TB may stop receiving or listening for subsequent retransmissions by the base station at any time. Any UEs that have still failed to receive a recoverable TB after the $N^{th}$ instance of the multicast TB may transmit a NACK at time $t_4$.

In some other implementations, the base station may indicate to the UEs to refrain from transmitting HARQ feedback after each of the first N−1 instances of the multicast TB. For example, the base station may transmit a HARQ feedback indication with each HARQ transmission or retransmission. The HARQ feedback indication may explicitly indicate whether the HARQ feedback is permitted or prohibited for the associated HARQ transmission or retransmission. In some aspects, the HARQ feedback indication may be a 1-bit flag in a DCI associated with the respective HARQ transmission or retransmission. Assertion of the 1-bit flag may indicate that HARQ feedback is permitted and deassertion of the 1-bit flag may indicate that HARQ feedback is prohibited for the associated HARQ transmission or retransmission. In some other aspects, the HARQ feedback indication may be implied via a physical uplink control channel (PUCCH) entry carried on the same subframe or slot as the associated HARQ transmission or retransmission. For example, the base station may indicate that HARQ feedback is prohibited by defining the PUCCH entry as being invalid and may indicate that HARQ feedback is permitted by defining the PUCCH entry as being valid.

With reference for example to FIG. 6B, the base station transmits a first instance of the multicast TB via an initial HARQ transmission (TX) at time to and the remaining N−1 instances of the multicast TB via subsequent retransmissions (ReTX) of the multicast TB from times $t_1$-$t_3$. The base station may transmit a respective HARQ feedback indication (HARQ FB) with each HARQ transmission and retransmission. Each UE may determine, based on the HARQ feedback indication, whether HARQ feedback is permitted or prohibited for the associated HARQ transmission or retransmission. The HARQ feedback indication is deasserted (HARQ FB=0) for the initial HARQ transmission and the subsequent N−2 retransmissions to indicate that HARQ feedback is prohibited after each of the first N−1 instances of the multicast TB. The HARQ feedback indication is asserted (HARQ FB=1) for the last HARQ retransmission to indicate that HARQ feedback is permitted in response to the $N^{th}$ instance of the multicast TB. A UE that receives a recoverable TB may stop receiving or listening for subsequent retransmissions by the base station at any time. Any UEs that have still failed to receive a recoverable TB after the $N^{th}$ instance of the multicast TB may transmit a NACK at time $t_4$.

In some other implementations, the base station may indicate to the UEs to transmit HARQ feedback (if any) only after the $N^{th}$ instance of the multicast TB. For example, the base station may transmit a HARQ feedback timing indicator indicating a window of time (also referred to as a "HARQ feedback window") within which the UEs are permitted to transmit HARQ feedback. More specifically, the HARQ feedback timing indicator may point to an instance or duration of time following the HARQ transmission or retransmission associated with the $N^{th}$ instance of the multicast TB. In some aspects, the HARQ feedback timing indicator may be transmitted to each of the UEs via an MCCH. In some other aspects, the HARQ feedback timing indicator may be transmitted via an RRC message associated with the multicast transmission, where the RRC message can be transmitted in a SIB or in unicast PDSCHs to respective UEs in the multicast group. The HARQ feedback window may be represented by a system frame number (SFN) or a subframe offset relative to the MCCH periodicity.

With reference for example to FIG. 6C, the base station transmits a first instance of the multicast TB via an initial HARQ transmission (TX) at time to and the remaining N−1 instances of the multicast TB via subsequent retransmissions (ReTX) of the multicast TB from times $t_1$-$t_3$. The base station may transmit a HARQ feedback timing indicator via an MCCH or an RRC message associated with the multicast transmission, where the RRC message can be transmitted in a SIB or in unicast PDSCHs to respective UEs in the multicast group, prior to time to (not shown for simplicity). The HARQ feedback timing indicator may point to a HARQ feedback window from times $t_4$ to $t_5$. Each UE may determine, based on the received HARQ feedback timing indicator, to exclusively transmit HARQ feedback (if any) during the indicated HARQ feedback window. A UE that receives a recoverable TB may stop receiving or listening for subsequent retransmissions by the base station at any time. Any UEs that have still failed to receive a recoverable TB after the $N^{th}$ instance of the multicast TB may transmit a NACK between times $t_4$ and $t_5$.

Figure 7A:
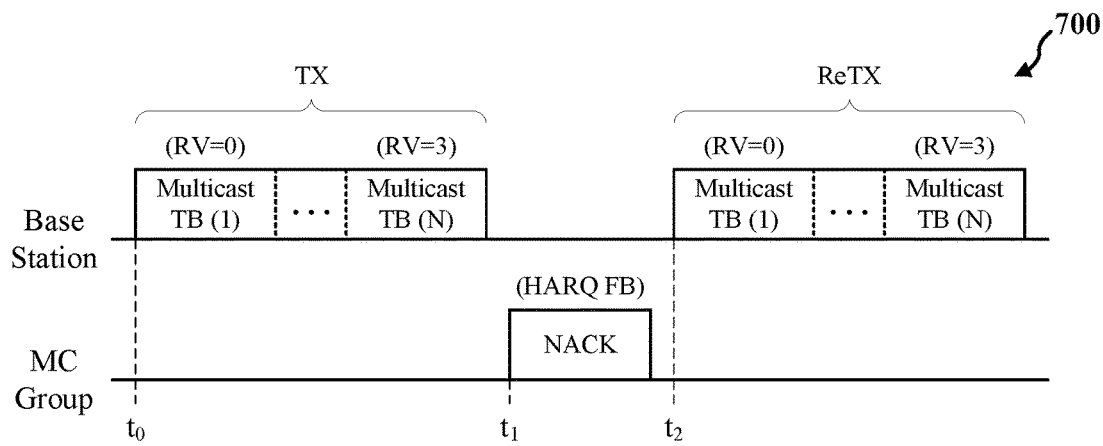
FIGS. 7A-7C show timing diagrams depicting example multicast communications between a base station and a multicast group, according to some implementations.
Figure 7B:
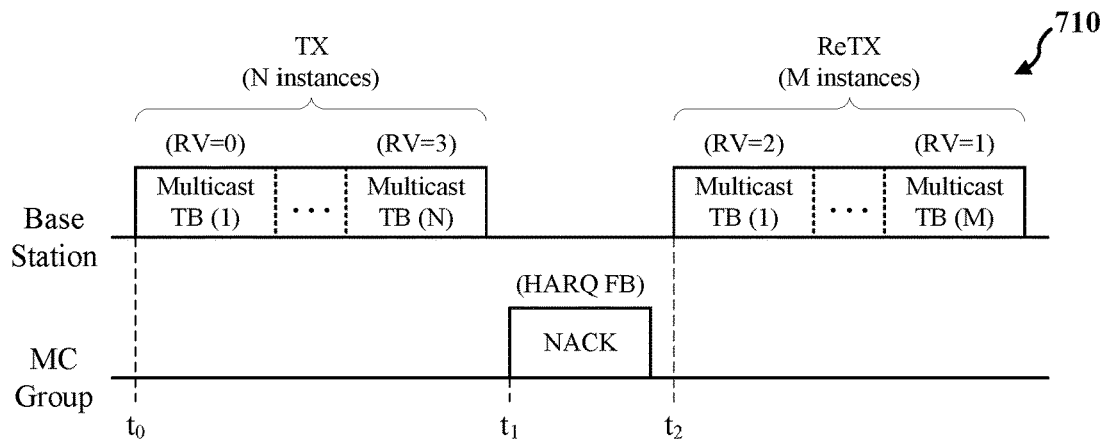
Figure 7C:
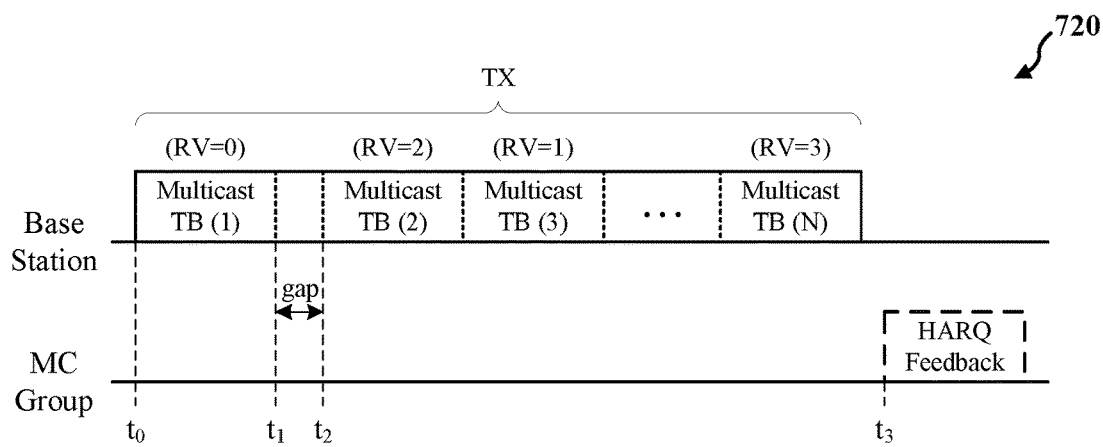

FIGS. 7A-7C show timing diagrams 700-720, respectively, depicting example multicast communications between a base station and a multicast group, according to some implementations. In some implementations, the base station may be one example of the base stations 102, 310, or 402 of FIGS. 1, 3, and 4, respectively. The multicast group may include a number (Nu E) of UEs. In some implementations, each UE may be one example of the UEs 104, 350, or 404 of FIGS. 1, 3, and 4, respectively. The multicast communications 700-720 are associated with respective HARQ processes by which the base station transmits a multicast TB to the UEs in the multicast group.

In some implementations, the base station may determine a number (N) of instances of the multicast TB to be transmitted to the multicast group based, at least in part, on the number ($N_{UE}$) of UEs in the multicast group. In some aspects, the number of instances to be transmitted to the multicast group also may depend on the signal quality at the locations of each UE. For example, the base station may further determine the value of N based on the number of UEs and the SINR or CQI reported by each UE in the multicast group. In the examples of FIGS. 7A-7C, the base station may transmit each of the N instances of the multicast TB in the HARQ transmission triggered by a single DCI. For example, the base station may transmit each instance of the multicast TB on a respective physical downlink shared channel (PDSCH) associated with a HARQ transmission (TX). In some implementations, each instance of the multicast TB may be transmitted in a group-common PDSCH. Thus, the timeline (K1) for HARQ feedback may be counted from the PDSCH carrying the $N^{th}$ instance of the multicast TB. For example, the HARQ feedback will be the K1 slot(s) after the PDSCH carrying the $N^{th}$ instance of the multicast TB.

In some implementations, the base station may enable or disable HARQ feedback, such as an ACK or a NACK, during transmission of the N instances of the multicast TB. In some such implementations, the HARQ feedback may be enabled or disabled via a DCI message. The DCI may explicitly or implicitly enable or disable the HARQ feedback. In other such implementations, RRC signaling may enable or disable the HARQ feedback or configure a function at the UE for enabling or disabling the HARQ feedback. In some such implementations, a DCI message may enable or disable the HARQ feedback based on the RRC signaling configuring the function. The RRC signaling may be for multicast TB identified by a group-common network temporary identifier (RNTI) configured for the UEs. The DCI message may be transmitted on a group-common PDCCH with a CRC scrambled by a group-common RNTI configured for the UEs. In some implementations, the multicast TB is transmitted on a group-common PDSCH scrambled by a group-common RNTI configured for the UEs. In some other such implementations, the DCI does not indicate whether the HARQ feedback is enabled or disabled if the RRC signaling does not enable the function at the receiving device. In some other implementations, a medium access control-control element (MAC-CE) message may enable or disable the HARQ feedback. In some such implementation, the RRC signaling may configure a function at the UE for enabling or disabling the HARQ feedback and the MAC-CE message may enable or disable the HARQ feedback based on the RRC signaling configuring the function. Additionally, in some implementations, the receiving device may be in an RRC connected mode when receiving the RRC signaling to configure the function and one of the DCI message or the MAC-CE message. In some implementations, the receiving device may be configured with a default mode that enables HARQ feedback or disables HARQ feedback by default.

In the examples of FIGS. 7A-7C, the N instances of the multicast TB are transmitted in a HARQ transmission triggered by a single DCI. In such examples, the UEs may not transmit HARQ feedback until after the $N^{th}$ instance of the multicast TB based on a receiving indication to disable the HARQ feedback. In other words, the base station may transmit all N instances of the multicast TB uninterrupted. As described, the indication may be received via a DCI message or a MAC-CE message.

Additionally, RRC signaling may enable or disable a function for enabling or disabling HARQ feedback based on a received indication.

In some implementations, the base station may transmit an indication of the number (N) of instances. In such implementations, the number of instances may be transmitted on a group-common PDSCH scrambled by a group-common RNTI configured for the UEs. An indication of the number of instances may be transmitted to the receiving device when the receiving device is in an RRC connected mode. In some such implementations, the indication of the number of instances may be transmitted via a DCI message. In other such implementations, the indication of the number of instances may be transmitted via RRC signaling. In such implementations, the RRC signaling may indicate the number of instances via a pdsch-AggregationFactor information element. In still other such implementations, the indication of the number of instances may be transmitted via a DCI message and RRC signaling. In such implementations, the DCI message and RRC signaling may indicate the number of instances via a repitionNumber element of a time domain resource allocation (TDRA) table. In some implementations, the RRC signaling indicates candidate values for a number of instances and a DCI message identifies a selected value for the number of instances from the candidate values. In such implementations, the DCI message is transmitted on a group-common PDCCH with CRC scrambled by the group-common RNTI configured for the UEs. In some implementations, if a receiving device receives an indication via the TDRA table, the receiving device may not expect an indication via the pdsch-AggregationFactor information element for a same group-common PDSCH. In yet other such implementations, the indication of the number of instances may be transmitted via a MAC-CE message or a combination of RRC signaling and the MAC-CE message.

In some other implementations, the base station may transmit an indication of the number (N) of instances via an MCCH or an RRC signal associated with the multicast transmission, where the RRC signal can be transmitted in a SIB or in unicast PDSCHs to respective UEs in the multicast group. Accordingly, the number (N) of instances may be semi-statically configured across multiple HARQ transmissions. In some other implementations, the base station may transmit an indication of the number (N) of instances via the DCI associated with the HARQ transmission. Accordingly, the number (N) of instances may be dynamically configured per HARQ transmission. Each of the N instances of the multicast TB may represent N repetitions associated with a particular RV order. The RV value associated with the first instance of the N instances may be indicated in a DCI. The RV values of the following N−1 instances will follow the cyclic order of the predefined RV order. For example, the RV values for every four repetitions may be in the order of 0, 2, 1, and 3. If the DCI indicates RV=0 for N=2, RV=0, 2 are the RV values for the $1^{st}$ and $2^{nd}$ instances, respectively. When the DCI indicates RV=1 for N=4, RV=1, 3, 0, and 2 are the RV values for the $1^{st}$, $2^{nd}$, $3^{rd}$, and $4^{th}$ instances, respectively.

With reference, for example, to FIG. 7A, the base station transmits the N instances of the multicast TB via an initial HARQ transmission (TX) at time to. In the example of FIG. 7A, the first instance of the multicast TB (Multicast TB (1)) is associated with an RV value of 0 and the $N^{th}$ instance of the multicast TB (Multicast TB (N)) is associated with an RV value of 3. At time $t_1$, after the transmission of Multicast TB (N), at least one of the UEs in the multicast group transmits a NACK to the base station. In response to the NACK, at time $t_2$, the base station retransmits the N instances of the multicast TB via a retransmission (ReTX) associated with the same HARQ process. As shown in FIG. 7A, the order of the RV values may not change between the initial HARQ transmission and the retransmission. Thus, in some implementations, the order of the RV values and the number (N) of instances may be indicated via an MCCH or an RRC message associated with the multicast transmission, where the RRC message can be transmitted in a SIB or in unicast PDSCHs to respective UEs in the multicast group.

With reference, for example, to FIG. 7B, the base station transmits the N instances of the multicast TB via an initial HARQ transmission (TX) at time $t_0$. In the example of FIG. 7B, the first instance of the multicast TB (Multicast TB (1)) is associated with an RV value of 0 and the $N^{th}$ instance of the multicast TB (Multicast TB (N)) is associated with an RV value of 3. At time $t_1$, after the transmission of Multicast TB (N), at least one of the UEs in the multicast group transmits a NACK to the base station. In response to the NACK, at time $t_2$, the base station retransmits a different number (M) of instances of the multicast TB via a retransmission (ReTX) associated with the same HARQ process. As shown in FIG. 7B, the order of the RV values may also change between the initial HARQ transmission and the retransmission. For example, the first instance of the multicast TB (Multicast TB (1)) is associated with an RV value of 2, as indicated in the DCI. Thus, in some implementations, the order of the RV values and the number of instances may follow the predefined RV order indicated in the DCI.

Still further, in some implementations, the base station may provide a gap between the transmissions of two or more consecutive instances of the multicast TB. With reference, for example, to FIG. 7C, the base station transmits the N instances of the multicast TB via an initial HARQ transmission (TX) at time to. In the example of FIG. 7C, the first instance (1) of the multicast TB is associated with an RV value of 0, the second instance (2) is associated with an RV value of 2, the third instance (3) is associated with an RV value of 1, and the $N^{th}$ instance (N) is associated with an RV value of 3. A gap is provided, from times $t_1$ to $t_2$, between the transmission of the first instance (1) and the second instance (2). In some implementations, the gap may be configured to allow each UE time to process the first instance (1) of the multicast TB and determine whether additional instances are needed to receive a recoverable TB. A UE that receives a recoverable TB may stop receiving or detecting subsequent PDSCHs in the HARQ transmission (early termination for power saving). Any UEs that have still failed to receive a recoverable TB after the $N^{th}$ instance of the multicast TB may transmit a NACK at time $t_3$. Introducing a similar gap between two other instances of the multicast TB may result in large latency due to the extended transmission time. Thus, in some implementations, no gap may be added after any of the instances of the multicast TB following the first instance, as illustrated in FIG. 7C. In some other implementations, a smaller gap (than the one between the first and second instances) may be added after one or more of the subsequent instances of the multicast TB.

Figure 8A:
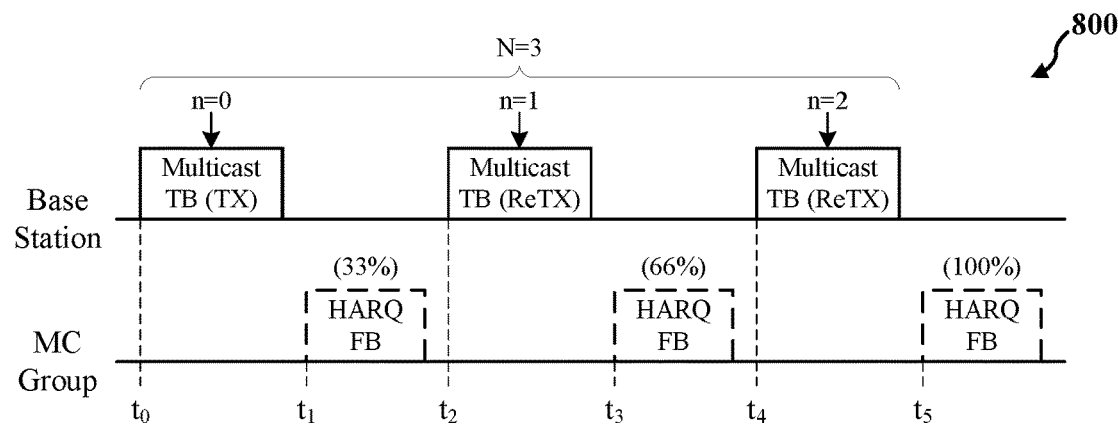
FIGS. 8A-8C show timing diagrams depicting example multicast communications between a base station and a multicast group, according to some implementations.
Figure 8B:
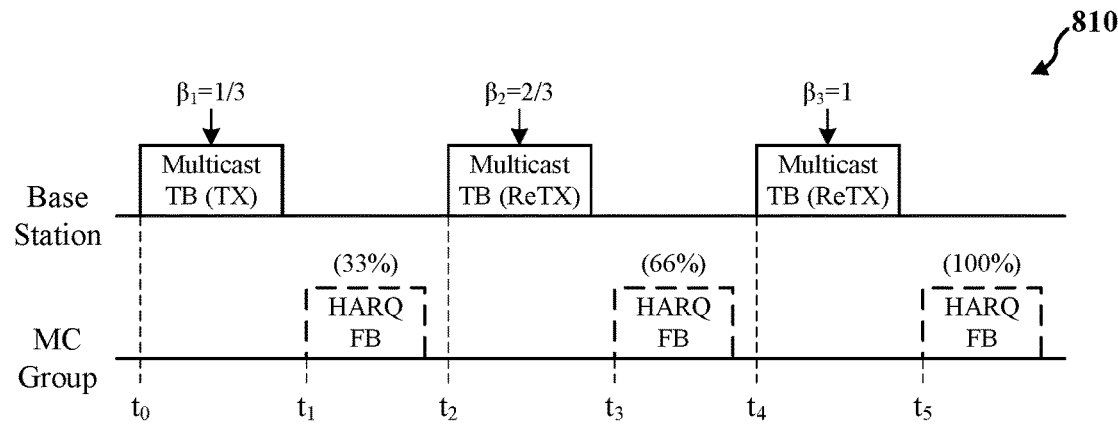
Figure 8C:
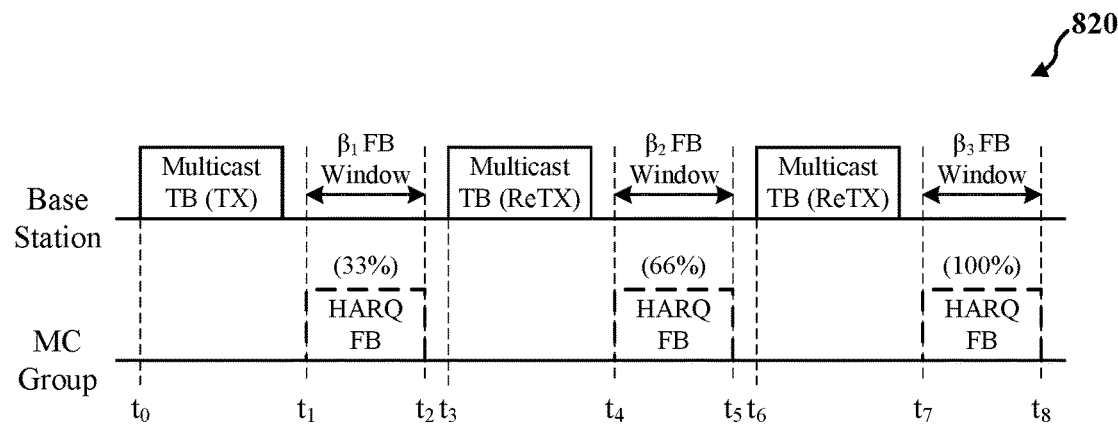

FIGS. 8A-8C show timing diagrams 800-820, respectively, depicting example multicast communications between a base station and a multicast group, according to some implementations. In some implementations, the base station may be one example of the base stations 102, 310, or 402 of FIGS. 1, 3, and 4, respectively. The multicast group may include a number (Nu E) of UEs. In some implementations, each UE may be one example of the UEs 104, 350, or 404 of FIGS. 1, 3, and 4, respectively. The multicast communications 800-820 are associated with respective HARQ processes by which the base station transmits a multicast TB to the UEs in the multicast group.

In some implementations, the base station may determine a number (N) of instances of the multicast TB to be transmitted to the multicast group based, at least in part, on the number (Nu E) of UEs in the multicast group. In some aspects, the number of instances to be transmitted to the multicast group also may depend on the signal quality at the locations of each UE. For example, the base station may further determine the value of N based on the number of UEs that may be interested in receiving the multicast services. In the examples of FIGS. 8A-8C, the base station may transmit each of the N instances of the multicast TB in a respective HARQ transmission (or retransmission). For example, the base station may transmit the first instance of the multicast TB in an initial HARQ transmission (TX) and may transmit the remaining N-1 instances of the multicast TB in successive retransmissions (ReTX) associated with the same HARQ process.

In some implementations, the base station may allow HARQ feedback from only a subset of the UEs in the multicast group after each of the N instances of the multicast TB. The base station may use the HARQ feedback information to perform a statistical analysis of the network. For example, the base station may estimate a number of active UEs that are receiving the multicast services based, at least in part, on any HARQ feedback received prior to the transmission of the $N^{th}$ instance of the multicast TB. In the examples of FIG. 8A-8C, the base station may monitor for HARQ feedback after each instance of the multicast TB has been transmitted. In some implementations, the base station may make a determination of whether to retransmit the multicast TB only after the $N^{th}$ instance of the multicast TB has been transmitted. In other words, the base station may continue to transmit all N instances of the multicast TB regardless of any HARQ feedback received prior to the $N^{th}$ instance.

In some implementations, the base station may indicate a probability (β) of a UE receiving a HARQ feedback opportunity after each instance of the multicast TB. Each UE in the multicast group may perform a random decision, based on the indicated probability, to determine whether it is provided a HARQ feedback opportunity after each respective instance. Thus, the subset of UEs allocated to each HARQ feedback opportunity may be self-selected by the individual UEs. As described with respect to FIG. 5, the likelihood of at least one UE failing to receive a recoverable TB (and thus transmit a NACK) decreases with each successive retransmission. To maintain power savings for a large portion of the UEs, while also acquiring statistical information about the UEs in the multicast group, the number of UEs allocated to each HARQ feedback opportunity may progressively increase with each successive retransmission. In some implementations, the base station may dynamically adjust β based, at least in part, on statistical information derived from a previous HARQ feedback opportunity.

In some implementations, the base station may indicate the probability (β) as a function of the number (N) of instances of the multicast TB and a respective index (n) associated with each HARQ transmission or retransmission ($0 \leq n \leq N_{max}$). For example, the indication of the number (N) of instances may be transmitted to each of the UEs via an MCCH or an RRC message associated with the multicast transmission, where the RRC message can be transmitted in a SIB or in unicast PDSCHs to respective UEs in the multicast group. Each of the indices (n) may be indicated via a respective DCI message transmitted with each HARQ transmission or retransmission. As described above, each of the indices (n) may be jointly coded with, or otherwise represented by, the RV and NDI information associated with the respective HARQ transmission. In some implementations, each UE may determine the probability ($\beta$) of being allocated a HARQ feedback opportunity as according to the ratio of the value of the current index to the total number N of instances (for example, $\beta=\min(1, n+1/N)$. Assuming n=0 for the initial transmission, $\beta=1/N$, which means statistically a ratio 1/N of multicast UEs which fail to receive a recoverable TB would send HARQ feedback; and if n>=N, $\beta=1$, which means HARQ feedback suppression is not applied and any UE in the multicast group which fails to receive a recoverable TB can send HARQ feedback.

With reference for example to FIG. 8A, the base station transmits a first instance (n=1) of the multicast TB via an initial HARQ transmission (TX) at time $t_0$, a second instance (n=2) of the multicast TB via a first retransmission (ReTX) at time $t_2$, and a third instance (n=3) of the multicast TB via a second retransmission (ReTX) at time $t_4$. The base station may transmit an indication of the number of instances (N=3) to each of the UEs via an MCCH or an RRC message associated with the multicast transmission, where the RRC message can be in SIB or in unicast PDSCH to respective multicast UE, prior to time to (not shown for simplicity). The indices (n) may be indicated in respective DCIs associated with each HARQ transmission and retransmission. After the initial HARQ transmission, each UE may determine a probability ($\beta_i$) of being allocated a HARQ feedback opportunity as $\beta_1=\frac{1}{3}$. Thus, $\frac{1}{3}$ of the UEs in the multicast group may be expected to have a HARQ feedback opportunity at time $t_1$. After the first retransmission, each UE may determine a probability ($\beta_2$) of being allocated a HARQ feedback opportunity as $\beta_2=\frac{2}{3}$. Thus, $\frac{2}{3}$ of the UEs in the multicast group may be expected to have a HARQ feedback opportunity at time $t_3$. After the second retransmission, each UE may determine a probability ($\beta_3$) of receiving a HARQ feedback opportunity as $\beta_3=1$. Thus, all of the UEs in the multicast group may be expected to have a HARQ feedback opportunity at time $t_5$.

In some other implementations, the base station may explicitly indicate the probability ($\beta$) of being allocated a HARQ feedback opportunity after each instance of the multicast TB. For example, the base station may transmit a probability indicator with each HARQ transmission or retransmission. In some aspects, the probability indicator may be a 2-bit value in a DCI associated with the respective HARQ transmission or retransmission. A probability indicator value of "11" may indicate no HARQ feedback is permitted for the associated HARQ transmission or retransmission, a probability indicator value of "10" may indicate a small probability of HARQ feedback for the associated HARQ transmission or retransmission, a probability indicator value of "01" may indicate a high probability of HARQ feedback for the associated HARQ transmission or retransmission, and a probability indicator value of "00" may indicate all HARQ feedback is permitted for the associated HARQ transmission or retransmission.

With reference for example to FIG. 8B, the base station transmits a first probability indicator ($\beta_1$ corresponding to 10) with a first instance of the multicast TB via an initial HARQ transmission (TX) at time $t_0$, a second probability indicator ($\beta_2$ corresponding to 01) with a second instance of the multicast TB via a first retransmission (ReTX) at time $t_2$, and a third probability indicator ($\beta_3$ corresponding to 00) with a third instance of the multicast TB via a second retransmission (ReTX) at time $t_4$. In the example of FIG. 8B, the first probability indicator ($\beta_1$ corresponding to 10) may represent a probability of $\beta_1=\frac{1}{3}$, the second probability indicator ($\beta_2$ corresponding to 01) may represent a probability of $\beta_2=\frac{2}{3}$, and the third probability indicator ($\beta_3$ corresponding to 00) may represent a probability of $\beta_3=1$. Thus, $\frac{1}{3}$ of the UEs in the multicast group may be expected to have a HARQ feedback opportunity at time $t_1$, $\frac{2}{3}$ of the UEs in the multicast group may be expected to have a HARQ feedback opportunity at time $t_3$, and all of the UEs in the multicast group may be expected to have a HARQ feedback opportunity at time $t_5$.

In some other implementations, the base station may indicate a respective HARQ feedback window associated with each of the probabilities $\beta_1$-$\beta_3$. For example, the base station may transmit a HARQ feedback timing indicator indicating each of the probabilities $\beta_1$-$\beta_3$ and the respective HARQ feedback windows associated with the probabilities. More specifically, each HARQ feedback window may represent a duration or window of time within which a subset of UEs may transmit HARQ feedback following a respective HARQ transmission or retransmission. In some aspects, the HARQ feedback timing indicator may be transmitted to each of the UEs via an MCCH. In some other aspects, the HARQ feedback timing indicator may be transmitted via an RRC message associated with the multicast transmission, where the RRC message can be transmitted in a SIB or in unicast PDSCHs to respective UEs in the multicast group. Each HARQ feedback window may be represented by an SFN or a subframe offset relative to the MCCH periodicity.

With reference for example to FIG. 8C, the base station transmits a first instance of the multicast TB via an initial HARQ transmission (TX) at time to, a second instance of the multicast TB via a first retransmission (ReTX) at time $t_2$, and a third instance of the multicast TB via a second retransmission (ReTX) at time $t_4$. The base station may transmit a HARQ feedback timing indicator via an MCCH or an RRC message associated with the multicast transmission, where the RRC message can be transmitted in a SIB or in unicast PDSCHs to respective UEs in the multicast group, prior to time to (not shown for simplicity). The HARQ feedback timing indicator may point to a first HARQ feedback window from times $t_1$ to $t_2$, a second HARQ feedback widow from times $t_4$ to $t_5$, and a third HARQ feedback window from times $t_7$ to $t_8$. The HARQ feedback indicator may further indicate a first probability ($\beta_1$) associated with the first HARQ feedback window, a second probability ($\beta_2$) associated with the second HARQ feedback window, and a third probability ($\beta_3$) associated with the third HARQ feedback window. In the example of FIG. 8C, the probability indicators $\beta_1$, $\beta_2$, and $\beta_3$ may represent probabilities of $\frac{1}{3}$, $\frac{2}{3}$, and 1, respectively. Thus, $\frac{1}{3}$ of the UEs in the multicast group may be allowed to transmit HARQ feedback from times $t_1$ to $t_2$, $\frac{2}{3}$ of the UEs in the multicast group may be allowed to transmit HARQ feedback from times $t_4$ to $t_5$, and all of the UEs in the multicast group may be allowed to transmit HARQ feedback from times $t_7$ to $t_8$.

Figure 9:
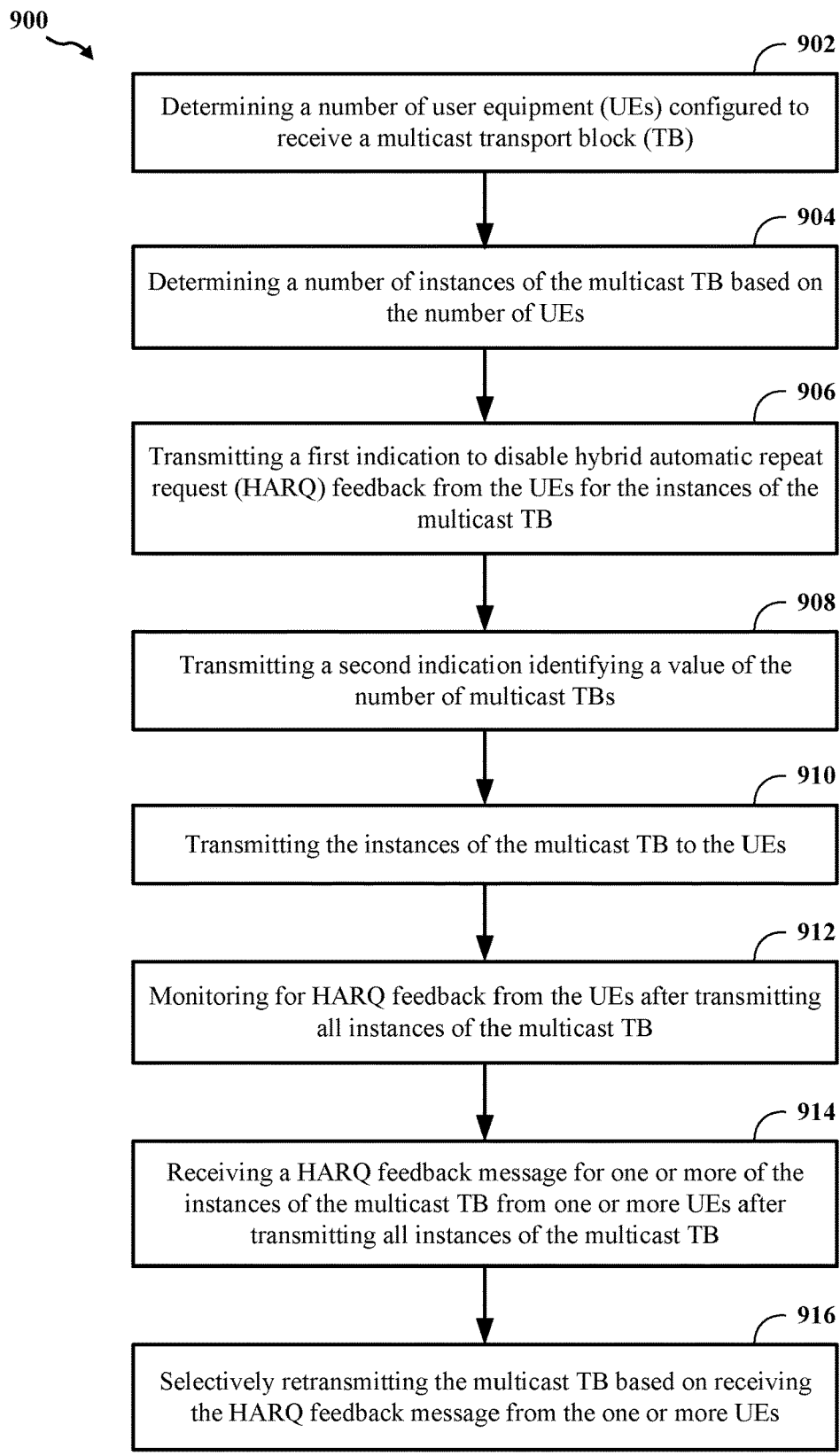
FIG. 9 shows a flowchart illustrating an example process for wireless communication that supports HARQ feedback control for multicast communications, according to some implementations.

FIG. 9 shows a flowchart illustrating an example process 900 for wireless communication that supports HARQ feedback control for multicast communications, according to some implementations. In some implementations, the process 900 may be performed by a wireless communication device operating as or within a network node, such as one of the base stations 102, 310, or 402 described above with reference to FIGS. 1, 3, and 4, respectively. In some such implementations, the receiving devices may be UEs, such as the UEs 104, 350, or 404 described above with respect to FIGS. 1, 3, and 4, respectively.

In some implementations, the process 900 begins in block 902 with determining a number of UEs configured to receive a multicast transport block (TB). In block 904, the process 900 proceeds with determining a number of instances of the multicast TB to transmit to the UEs based on the number of UEs. In block 906, the process 900 proceeds with transmitting a first indication to disable HARQ feedback from the UEs for the instances of the multicast TB. In block 908, the process 900 proceeds with transmitting a second indication identifying a value of the number of multicast TB s. In block 910, the process 900 proceeds with transmitting the instances of the multicast TB to the UEs. In block 912, the process 900 proceeds with monitoring for HARQ feedback from the UEs after transmitting all instances of the multicast TB. In block 914, the process 900 proceeds with receiving a HARQ feedback message for one or more of the instances of the multicast TB from one or more of the UEs after transmitting all instances of the multicast TB. In block 916, the process 900 proceeds with selectively retransmitting the multicast TB based on receiving the HARQ feedback message from one or more of the UEs.

Figure 10:
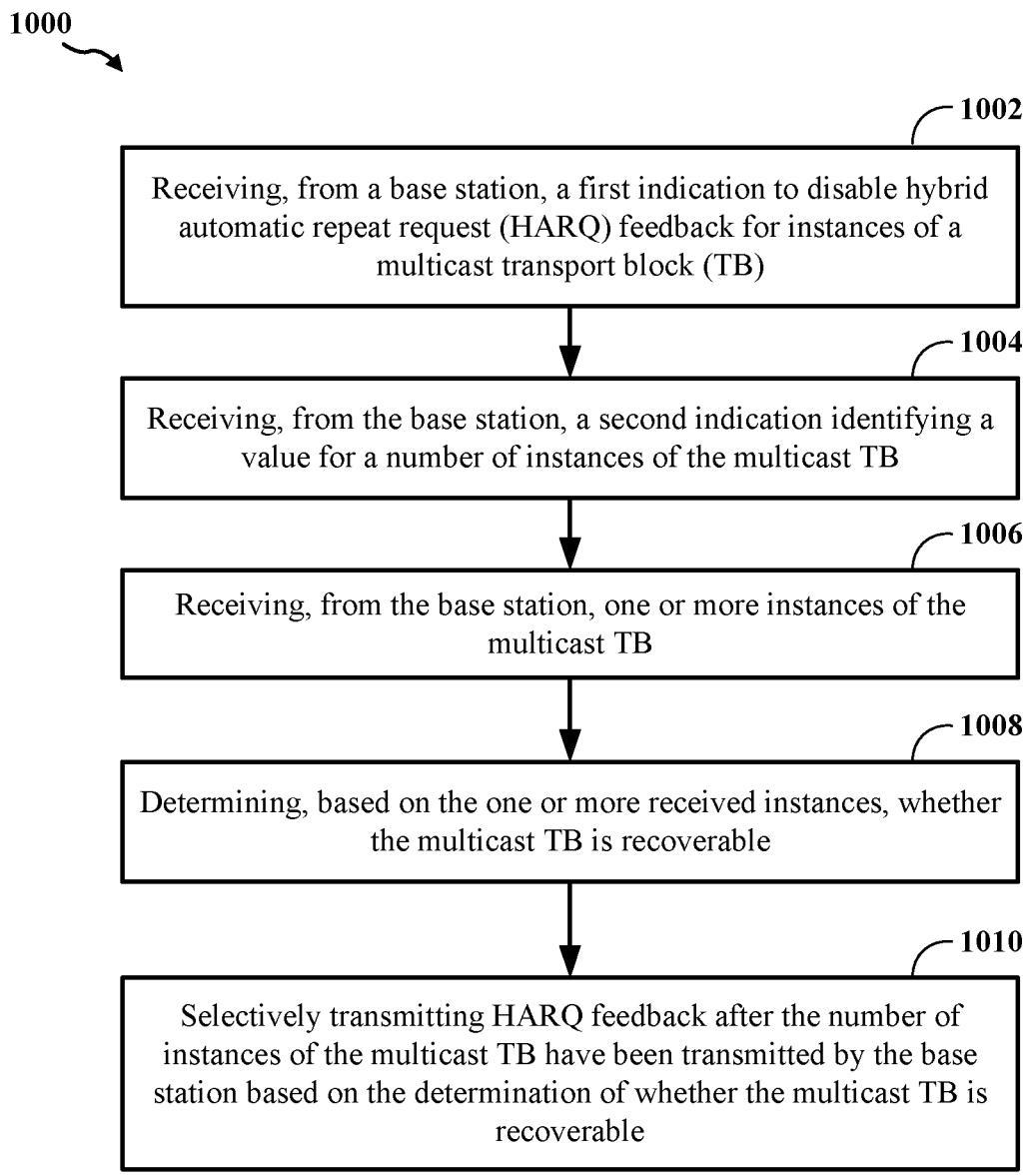
FIG. 10 shows a flowchart illustrating an example process for wireless communication that supports HARQ feedback control for multicast communications, according to some implementations.

FIG. 10 shows a flowchart illustrating an example process 1000 for wireless communication that supports HARQ feedback control for multicast communications, according to some implementations. In some implementations, the process 1000 may be performed by a wireless communication device operating as or within a UE, such as one of the UEs 104, 350, or 404 described above with respect to FIGS. 1, 3, and 4, respectively. In some such implementations, the transmitting device may be a base station, such as one of the base stations 102, 310, or 402 described above with reference to FIGS. 1, 3, and 4, respectively.

In some implementations, the process 1000 begins in block 1002 with receiving, from a base station, a first indication to disable HARQ feedback for instances of a multicast TB. In block 1004, the process 1000 proceeds with receiving, from a base station, a second indication identifying a value for a number of instances of the multicast TB. In block 1006, the process 1000 proceeds with receiving, from the base station, one or more instances of the multicast TB. In block 1008, the process 1000 proceeds with determining, based on the one or more received instances, whether the multicast TB is recoverable. In block 1010, the process 1000 proceeds with selectively transmitting HARQ feedback after the number of instances of the multicast TB have been transmitted by the base station based on the determination of whether the multicast TB is recoverable.

Figure 11:
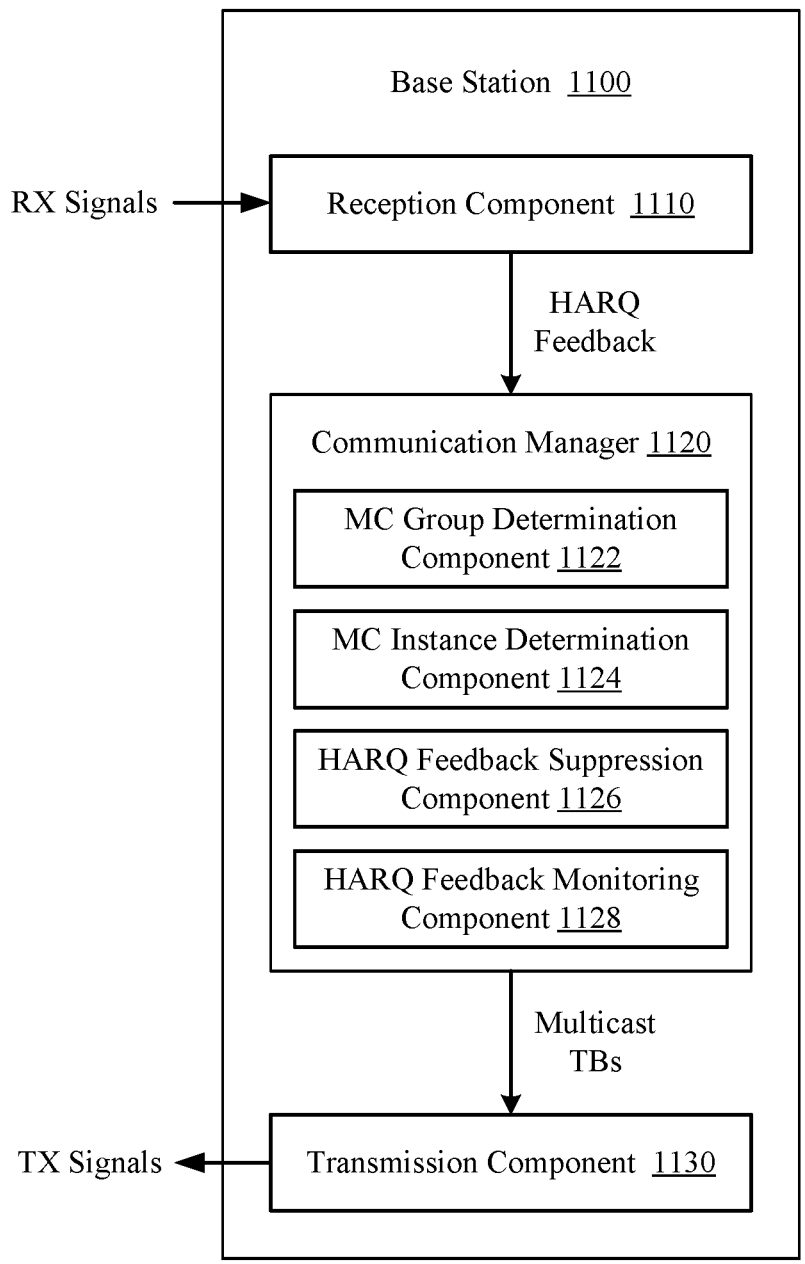
FIG. 11 shows a block diagram of an example base station, according to some implementations.

FIG. 11 shows a block diagram of an example base station 1100 according to some implementations. In some implementations, the base station 1100 is configured to perform the process 900 described above with reference to FIG. 9. The base station 1100 can be an example implementation of the base station 310 described above with reference to FIG. 3. For example, the base station 1100 can be a chip, SoC, chipset, package, or device that includes at least one processor and at least one modem (for example, a Wi-Fi (IEEE 802.11) modem or a cellular modem).

The base station 1100 includes a reception component 1110, a communication manager 1120, and a transmission component 1130. The communication manager 1120 further includes a multicast (MC) group determination component 1122, an MC instance determination component 1124, a HARQ feedback suppression component 1126, and a HARQ feedback monitoring component 1128. Portions of one or more of the components 1122-1128 may be implemented at least in part in hardware or firmware. In some implementations, at least some of the components 1122, 1124, 1126, or 1128 are implemented at least in part as software stored in a memory (such as the memory 376). For example, portions of one or more of the components 1122, 1124, 1126, and 1128 can be implemented as non-transitory instructions (or "code") executable by a processor (such as the controller/processor 375) to perform the functions or operations of the respective component.

The reception component 1110 is configured to receive RX signals from one or more wireless communication devices. In some implementations, the RX signals may include HARQ feedback from one or more wireless communication devices (for example, UEs) of a multicast group. The communication manager 1120 is configured to control or manage multicast communications with the multicast group. In some implementations, the MC group determination component 1122 may determine a number of receiving devices configured to receive a multicast TB; the MC instance determination component 1124 may determine a number (N) of instances of the multicast TB to transmit to the receiving devices based on the number of receiving devices; the HARQ feedback suppression component 1126 may generate an indication to disable HARQ feedback from the receiving devices for the number of instances of the multicast TB; and the HARQ feedback monitoring component 1128 may monitor for HARQ feedback from the receiving devices. The transmission component 1130 is configured to transmit the instances of the multicast TB s, as one or more TX signals, to one or more wireless communication devices. In some implementations, the transmission component 1130 may also transmit the indication to disable HARQ feedback as well as an indication identifying a value of the number of instances of the multicast TB. In some implementations, the transmission component 1130 may selectively retransmit the multicast TB based on receiving the HARQ feedback message from one or more of the receiving devices.

Figure 12:
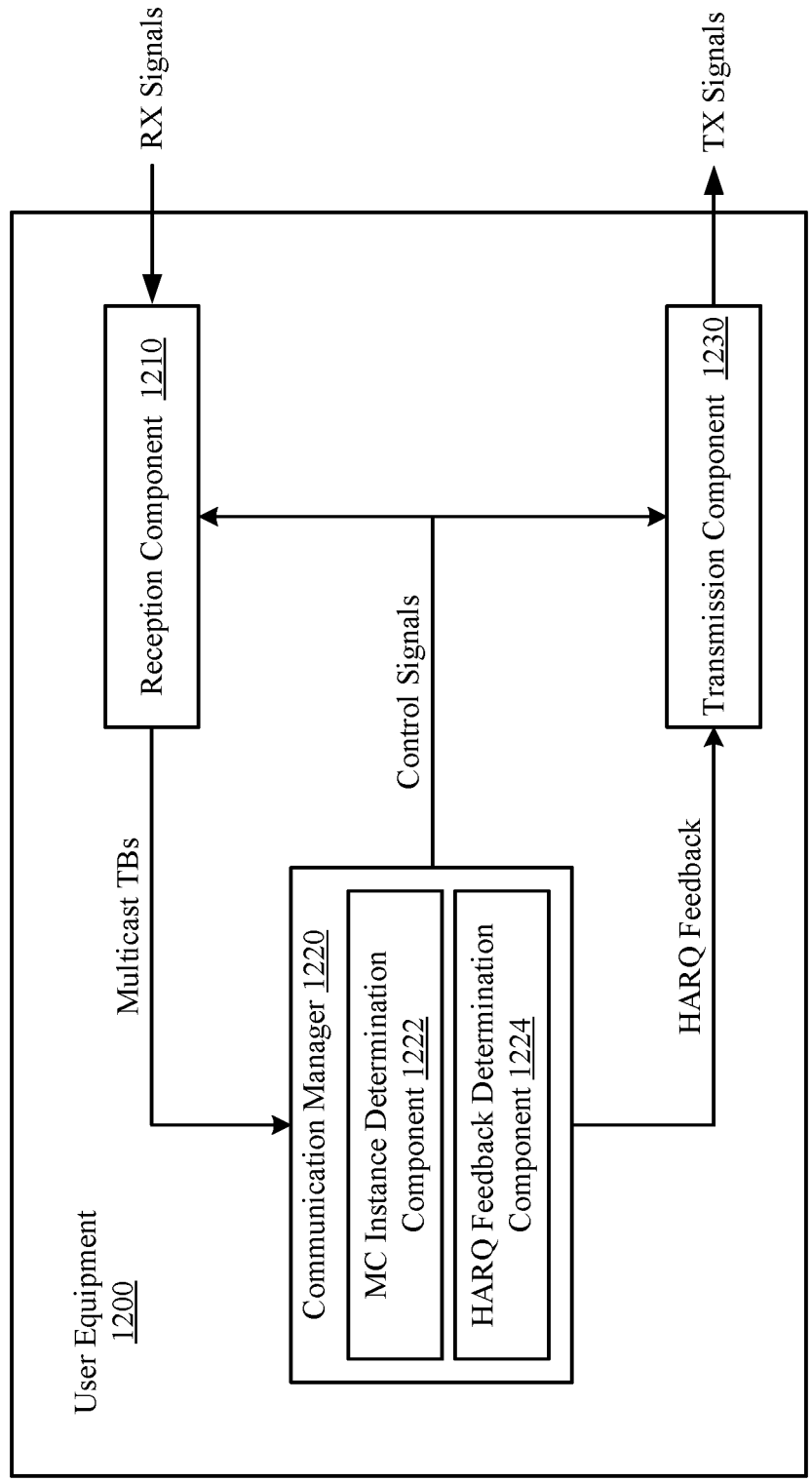
FIG. 12 shows a block diagram of an example UE, according to some implementations.

FIG. 12 shows a block diagram of an example UE 1200, according to some implementations. In some implementations, the UE 1200 is configured to perform the process 1000 described above with reference to FIG. 10. The UE 1200 can be an example implementation of the UE 350 described above with reference to FIG. 3. For example, the UE 1200 can be a chip, SoC, chipset, package, or device that includes at least one processor and at least one modem (for example, a Wi-Fi (IEEE 802.11) modem or a cellular modem).

The UE 1200 includes a reception component 1210, a communication manager 1220, and a transmission component 1230. The communication manager 1220 further includes a multicast (MC) instance determination component 1222 and a HARQ feedback determination component 1224. Portions of one or more of the components 1222 and 1224 may be implemented at least in part in hardware or firmware. In some implementations, at least some of the components 1222 or 1224 are implemented at least in part as software stored in a memory (such as the memory 360). For example, portions of one or more of the components 1222 and 1224 can be implemented as non-transitory instructions (or "code") executable by a processor (such as the controller/processor 359) to perform the functions or operations of the respective component.

The reception component 1210 is configured to receive RX signals from one or more wireless communication devices. In some implementations, the RX signals may include one or more instances of a multicast TB transmitted by a base station. The RX signals may also include an indication to disable HARQ feedback for the instances of a multicast TB, as well as an indicating identifying a value of the number of instances of the multicast TB. The communication manager 1220 is configured to reduce a power consumption of the UE 1200 during multicast communications by preventing the reception component 1210 from receiving one or more instances of the multicast TB or preventing the transmission component 1230 from transmitting HARQ feedback in response to one or more instances of the multicast TB. In some implementations, the HARQ feedback determination component 1224 may determine, based on the one or more received instances, whether the multicast TB is recoverable. The transmission component 1230 is configured to transmit HARQ feedback, as one or more TX signals, to the transmitting device. In some implementations, the transmission component 1230 may selectively transmit a NACK after a number (N) of instances of the multicast TB have been transmitted by the transmitting device, where the NACK is selectively transmitted responsive to the $N^{th}$ instance of the multicast TB based at least in part on the determination of whether the multicast TB is recoverable.

The following provides an overview of some Aspects of the present disclosure:

Aspect 1: A base station including a processor; and a memory communicatively coupled with the processor and storing instructions that, when executed by the processor, causes the base station to determine a number of UEs configured to receive a multicast TB; determine a number of instances of the multicast TB based on the number of UEs; transmit a first indication to disable HARQ feedback from the UEs for the instances of the multicast TB; transmit a second indication identifying a value of the number of instances of the multicast TB; transmit the instances of the multicast TB to the UEs; monitor for HARQ feedback from the UEs after transmitting all instances of the multicast TB; receive a HARQ feedback message associated with one or more of the instances of the multicast TB from one or more UEs after transmitting all instances of the multicast TB; and selectively retransmit the multicast TB based on receiving the HARQ feedback message from the one or more UEs.

Aspect 2: The base station of Aspect 1, wherein the first indication is transmitted via RRC signaling for the multicast TB identified by a group-common RNTI configured for the UEs.

Aspect 3: The base station of any of Aspect 1, wherein execution of the instructions further causes the base station to transmit, to each of the UEs, RRC signaling to configure a function for enabling and disabling the HARQ feedback via the first indication.

Aspect 4: The base station of Aspect 3, wherein the first indication is transmitted via a DCI message for enabling or disabling the HARQ feedback.

Aspect 5: The base station of Aspect 4, wherein the DCI message is transmitted on a group-common PDCCH with CRC scrambled by a group-common RNTI configured for the UEs.

Aspect 6: The base station of any of Aspects 1 through 5, wherein each instance of the multicast TB is transmitted on a group-common PDSCH scrambled by a group-common RNTI configured for the UEs.

Aspect 7: The base station of Aspects 6, wherein the second indication is transmitted via RRC signaling for the multicast TB identified by the group-common RNTI configured for the UEs.

Aspect 8: The base station of Aspect 7, wherein the RRC signaling indicates candidate values for the number of instances and a DCI message identifies a selected value for the number of instances from the candidate values.

Aspect 9: The base station of Aspect 8, where the DCI message is transmitted on a group-common PDCCH with CRC scrambled by the group-common RNTI configured for the UEs.

Aspect 10: A UE including a processor; and a memory communicatively coupled with the processor and storing instructions that, when executed by the processor in conjunction with the modem, causes the UE to receive, from a base station, a first indication to disable HARQ feedback for instances of a multicast TB; receive, from a base station, a second indication identifying a value of a number of instances of the multicast TB; receive, from the base station, one or more of the number of instances of the multicast TB; determine, based on the one or more received instances, whether the multicast TB is recoverable; and selectively transmit, to the base station after the number of instances of the multicast TB have been transmitted, HARQ feedback associated with the one or more received instances based on the determination of whether the multicast TB is recoverable.

Aspect 11: The UE of Aspect 10, wherein the first indication is received via RRC signaling for the multicast TB identified by a group-common RNTI configured for the UE.

Aspect 12: The UE of Aspect 10, wherein execution of the instructions further causes the UE to receive, from the base station, RRC signaling to configure a function for enabling and disabling the HARQ feedback via the first indication.

Aspect 13: The UE of Aspect 12, wherein the first indication is received via a DCI message for enabling or disabling the HARQ feedback.

Aspect 14: The UE of Aspect 13, wherein the DCI message is received on a group-common PDCCH with CRC scrambled by a group-common RNTI configured for the UE.

Aspect 15: The UE of any of Aspects 10 through 14, wherein each instance of the multicast TB is received on a group-common PDSCH scrambled by a group-common RNTI configured for the UE.

Aspect 16: The UE of Aspect 15, wherein the second indication is received via RRC signaling for the multicast TB identified by the group-common RNTI configured for the UE.

Aspect 17: The UE of Aspect 16, wherein the RRC signaling indicates candidate values for the number of instances and a DCI message identifies a selected value for the number of instances from the candidate values.

Aspect 18: The UE of Aspect 17, wherein the DCI message is received on a group-common PDCCH with CRC scrambled by the group-common RNTI configured for the UE.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware, and software has been described generally, in terms of functionality, and illustrated in the various illustrative components, blocks, modules, circuits, and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A network node comprising:
one or more processors; and
one or more memories communicatively coupled with the one or more processors and storing instructions that, when executed by the one or more processors, cause the network node to:
transmit a first indication to disable hybrid automatic repeat request (HARQ) feedback, via a physical uplink control channel (PUCCH), from a group of user equipment (UEs) for a number of instances of a multicast transport block (TB);
transmit a second indication identifying a value of the number of instances of the multicast TB;
transmit the instances of the multicast TB to the group of UEs;
monitor for HARQ feedback from the group of UEs after transmitting all instances of the multicast TB;
receive, via the PUCCH, a first HARQ feedback message associated with one or more of the instances of the multicast TB from one or more UEs of the group of UEs after transmitting all instances of the multicast TB; and
selectively retransmit the multicast TB based on receiving the first HARQ feedback message from the one or more UEs.

2. The network node of claim 1, wherein the first indication is a one-bit flag included in a downlink control information (DCI) message.

3. The network node of claim 1, wherein execution of the instructions further cause the network node to transmit a message indicating a repetition number for retransmitting the multicast TB.

4. The network node of claim 3, wherein the message is a radio resource control (RRC) message.

5. The network node of claim 3, wherein the message is transmitted via a multicast control channel (MCCH).

6. The network node of claim 3, wherein the message is a downlink control information (DCI) message transmitted on a group-common physical downlink control channel (PDCCH) with CRC scrambled by a group-common radio network temporary identifier (RNTI).

7. The network node of claim 1, wherein execution of the instructions further cause the network node to receive, from the one or more UEs, a second HARQ feedback message after selectively retransmitting the multicast TB.

8. A method for wireless communication by a network node comprising:
transmitting a first indication to disable hybrid automatic repeat request (HARQ) feedback, via a physical uplink control channel (PUCCH), from a group of user equipment (UEs) for a number of instances of a multicast transport block (TB);
transmitting a second indication identifying a value of the number of instances of the multicast TB;
transmitting the instances of the multicast TB to the group of UEs;
monitoring for HARQ feedback from the group of UEs after transmitting all instances of the multicast TB;
receiving, via the PUCCH, a first HARQ feedback message associated with one or more of the instances of the multicast TB from one or more UEs of the group of UEs after transmitting all instances of the multicast TB; and
selectively retransmitting the multicast TB based on receiving the first HARQ feedback message from the one or more UEs.

9. The method of claim 8, wherein the first indication is a one-bit flag included in a downlink control information (DCI) message.

10. The method of claim 8, further comprising transmitting a message indicating a repetition number for retransmitting the multicast TB.

11. The method of claim 10, wherein the message is a radio resource control (RRC) message.

12. The method of claim 10, wherein the message is transmitted via a multicast control channel (MCCH).

13. The method of claim 10, wherein the message is a downlink control information (DCI) message transmitted on a group-common physical downlink control channel (PDCCH) with CRC scrambled by a group-common radio network temporary identifier (RNTI).

14. The method of claim 8, further comprising receiving, from the one or more UEs, a second HARQ feedback message after selectively retransmitting the multicast TB.

15. A user equipment (UE), comprising:
one or more processors; and
one or more memories communicatively coupled with the one or more processors and storing instructions that, when executed by the one or more processors, cause the UE to:
receive, from a network node, a first indication to disable hybrid automatic repeat request (HARQ) feedback, via a physical uplink control channel (PUCCH), for a number of instances of a multicast transport block (TB);
receive, from the network node, a second indication identifying a value of the number of instances of the multicast TB;
receive, from the network node, one or more instances of the multicast TB; and
selectively transmit, to the network node via the PUCCH after all instances of the multicast TB have been transmitted, HARQ feedback associated with the one or more received instances in accordance with the multicast TB being recoverable.

16. The UE of claim 15, wherein the first indication is a one-bit flag included in a downlink control information (DCI) message.

17. The UE of claim 15, wherein execution of the instructions further cause the one or more processors to receive one or more retransmissions of the multicast TB based on selectively transmitting the HARQ feedback.

18. A method for wireless communication by a user equipment (UE) comprising:
receiving, from a network node, a first indication to disable hybrid automatic repeat request (HARQ) feedback, via a physical uplink control channel (PUCCH), for a number of instances of a multicast transport block (TB);
receiving, from the network node, a second indication identifying a value of the number of instances of the multicast TB;
receiving, from the network node, one or more instances of the multicast TB; and
selectively transmitting, to the network node via the PUCCH after all instances of the multicast TB have been transmitted, HARQ feedback associated with the one or more received instances in accordance with the multicast TB being recoverable.

19. The method of claim 18, wherein the first indication is a one-bit flag included in a downlink control information (DCI) message.

20. The method of claim 18, further comprising receiving one or more retransmissions of the multicast TB based on selectively transmitting the HARQ feedback.

* * * * *